(12) United States Patent
Nakai et al.

(10) Patent No.: US 9,651,200 B2
(45) Date of Patent: May 16, 2017

(54) SLURRY-TRANSPORTING FACILITY AND SLURRY TRANSPORTATION CONTROL METHOD

(71) Applicant: SUMITOMO METAL MINING CO., LTD., Tokyo (JP)

(72) Inventors: Osamu Nakai, Tokyo (JP); Satoshi Matsubara, Tokyo (JP); Hiroyuki Mitsui, Tokyo (JP); Kenji Tachi, Tokyo (JP); Masayuki Oku, Tokyo (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 27 days.

(21) Appl. No.: 14/760,020

(22) PCT Filed: Dec. 10, 2013

(86) PCT No.: PCT/JP2013/083088
§ 371 (c)(1),
(2) Date: Jul. 9, 2015

(87) PCT Pub. No.: WO2014/109160
PCT Pub. Date: Jul. 17, 2014

(65) Prior Publication Data
US 2015/0338027 A1    Nov. 26, 2015

(30) Foreign Application Priority Data

Jan. 10, 2013 (JP) ................................ 2013-002815

(51) Int. Cl.
*F17D 3/01*    (2006.01)
*F17D 1/08*    (2006.01)
(Continued)

(52) U.S. Cl.
CPC ...... *F17D 3/01* (2013.01); *B01J 3/02* (2013.01); *C22B 23/00* (2013.01); *C22B 23/043* (2013.01);
(Continued)

(58) Field of Classification Search
CPC ......... Y10T 137/86163; Y10T 137/776; Y10T 137/87507; Y10T 137/0352;
(Continued)

(56) References Cited

U.S. PATENT DOCUMENTS 2,288,727 A    7/1942    Mayer
3,799,716 A *  3/1974    Salts ..................... B05B 1/3013
                                                    118/301
(Continued)

FOREIGN PATENT DOCUMENTS

JP    H06-156725 A    6/1994
JP    H07-4600 A      1/1995
(Continued)

OTHER PUBLICATIONS

Mar. 18, 2014 International Search Report issued in International Patent Application No. PCT/JP2013/083088.
(Continued)

*Primary Examiner* — Atif Chaudry
(74) *Attorney, Agent, or Firm* — Oliff PLC

(57) ABSTRACT

A slurry-transporting facility equipped with a plurality of pump-equipment circuits, whereby a stop of slurry supply to a transport destination at the time of switchover between the pump-equipment circuits for use is prevented to make an efficient operation possible. The slurry-transporting facility includes: pipe arrangements which branch out from a feed tank into the plurality of circuits; a transport pump provided in each of the pipe arrangement; a first valve provided upstream from the transport pump; a second valve provided
(Continued)

downstream from the transport pump; and a uniting pipe arrangement formed by joining of the pipe arrangements at a predetermined position and connected to a LT heater. The uniting pipe arrangement is provided with a third valve configured to control the transportation of ore slurry to the LT heater and a pressure gauge configured to measure a pressure in the uniting pipe arrangement.

3 Claims, 8 Drawing Sheets

(51) Int. Cl.
  *F04B 41/06* (2006.01)
  *C22B 3/00* (2006.01)
  *F04B 15/02* (2006.01)
  *F17D 1/14* (2006.01)
  *B01J 3/02* (2006.01)
  *C22B 23/00* (2006.01)
  *F04B 49/08* (2006.01)

(52) U.S. Cl.
  CPC .............. *F04B 15/02* (2013.01); *F04B 41/06* (2013.01); *F04B 49/08* (2013.01); *F17D 1/088* (2013.01); *F17D 1/14* (2013.01); *Y10T 137/0352* (2015.04); *Y10T 137/0379* (2015.04); *Y10T 137/776* (2015.04); *Y10T 137/85978* (2015.04); *Y10T 137/86163* (2015.04); *Y10T 137/87314* (2015.04); *Y10T 137/87507* (2015.04)

(58) Field of Classification Search
  CPC .. Y10T 137/87314; F04B 41/06; F04B 15/02; C22B 23/043; F17D 3/01; F17D 1/088
  See application file for complete search history.

(56) References Cited

U.S. PATENT DOCUMENTS

| | | | | |
|---|---|---|---|---|
| 4,037,992 | A | * | 7/1977 | Uchida ................ F04B 9/1176 406/109 |
| 4,563,112 | A | | 1/1986 | Mokuya et al. |
| 6,033,187 | A | | 3/2000 | Addie |
| 2010/0286931 | A1 | * | 11/2010 | Mendelson ............... G01F 1/36 702/47 |
| 2012/0024393 | A1 | * | 2/2012 | Menet ...................... F17D 5/06 137/14 |

FOREIGN PATENT DOCUMENTS

| | | |
|---|---|---|
| JP | 2002-361296 A | 12/2002 |
| JP | 2003-326153 A | 11/2003 |
| JP | 2005-350766 A | 12/2005 |

OTHER PUBLICATIONS

Aug. 22, 2016 Search Report issued in European Patent Application No. 13870433.3.

* cited by examiner

SLURRY-TRANSPORTING FACILITY AND SLURRY TRANSPORTATION CONTROL METHOD

FIELD OF THE INVENTION

The present invention relates to a slurry-transporting facility and a slurry transportation control method. More specifically, the present invention relates to a slurry-transporting facility which is equipped with a plurality of pump-equipment circuits and configured to use one of the pump-equipment circuits with switching between the circuits and transport slurry to a reservoir tank as a transport destination, and relates to a slurry transportation control method which uses the slurry-transporting facility. The present application claims priority based on Japanese Patent Application No. 2013-002815 filed in Japan on Jan. 10, 2013. The total contents of the patent application are to be incorporated by reference into the present application.

BACKGROUND ART

In recent years, high pressure acid leach which uses sulfuric acid has been attracting attention as a hydrometallurgical process which is configured to recover nickel and cobalt from a nickel oxide ore containing iron as a main component and having a nickel content of 1% to 2% by mass. Unlike conventional common refining processes for nickel oxide ore, the high pressure acid leach does not include pyrometallurgical processing steps, such as a drying step and a roasting step, but includes consistent hydrometallurgical steps, and thus is advantageous in terms of energy and cost.

That is, the high pressure acid leach has a great advantage because, in a leaching step, the oxidation reduction potential and the temperature of a leachate in a pressure leaching reaction vessel are controlled to fix a main impurity, namely, iron, as a leach residue in the form of hematite ($Fe_2O_3$), whereby nickel and cobalt can be selectively leached out over iron.

Specifically, a nickel refining process using the high pressure acid leach includes, for example, the steps of: making a nickel oxide ore into slurry to prepare ore slurry (ore slurry preparation step); adding sulfuric acid to the ore slurry and leaching out nickel and cobalt under high temperature of 220 to 280° C. and high pressure by an autoclave to obtain leach slurry (leaching step); solid-liquid separating the leach slurry into a leach residue and a leachate containing nickel and cobalt (solid-liquid separation step); adjusting the pH of the leachate containing an impurity element together with nickel and cobalt to 3 to 4 to neutralize and separate the impurity element such as iron therefrom (neutralization step); and supplying hydrogen sulfide gas to the leachate obtained after the neutralization and separation to recover a nickel-cobalt mixed sulfide (sulfurization step), (for example, refer to Patent Document 1).

Here, in this nickel refining process, in the ore slurry preparation step, a nickel oxide ore is wet-grinded and sieved to obtain ore slurry which is adjusted to have a predetermined grain size. Then, in the leaching step, first, the ore slurry is made to pass through heaters provided in multiple stages, thereby being heated and pressurized step by step. Subsequently, in an autoclave, sulfuric acid is added under high pressure and temperature conditions produced by high-pressure steam, whereby nickel and cobalt and in addition some impurity elements are leached out into the liquid. Finally, the liquid is made to pass through flash tanks provided in multiple stages to reduce the temperature and the pressure of the liquid step by step.

As mentioned above, in the leaching step, using a pressurizer (autoclave) or the like which are made of very expensive materials, such as titanium, ceramics, and stainless steel, a leaching operation is performed usually under high temperature of 240 to 260° C. and high pressure. Therefore, in the high-pressure acid leach equipment to be used for the leaching step, also at the time of shutdown or startup for planned inspections and maintenance and the like, sufficient management based on predetermined standards is indispensable for security and equipment maintenance.

In the foregoing leaching step, when ore slurry is made to pass though the heaters provided in multiple stages to be heated and pressurized step by step, the ore slurry is pressurized in three stages (low pressure, middle pressure, high pressure), for example, and, in each of the stages, a high-pressure pump corresponding to the each stage is provided.

The high-pressure pump equipment provided in each of the stages is used under the strict conditions of temperature, pressure, and the like, and therefore, a periodic maintenance inspection needs to be conducted, and hence, a plurality of the pump-equipment circuits, for example, usually, two pump-equipment circuits are provided so that operations do not have to be stopped at the time of the maintenance inspection.

For example, in the two pump-equipment circuits, during normal operation, one circuit is in an operating state and the other circuit is in a waiting state. Furthermore, at the time of a maintenance inspection, there is commonly adopted a manner being such that the one circuit in an operating state is switched over to the other circuit in a waiting state so that the circuit in an operating state, which is subject to the maintenance inspection, is stopped (to be made into a waiting state), and the maintenance inspection is performed.

FIG. 8 illustrates a slurry-transporting facility 100 which is an example of conventional slurry-transporting facilities equipped with high-pressure pump-equipment circuits. This slurry-transporting facility 100 is equipped with two pump-equipment circuits (pump-equipment circuit X, pump-equipment circuit Y)

Here, a high-pressure pump (a transport pump) which is a constituent of each of the pump-equipment circuits is often disposed in the vicinity of the ground surface from viewpoints of convenience of maintenance inspections and the heaviness of the pump, and a reservoir tank as a transport destination for heated and pressurized ore slurry is often arranged to be kept at some distance from the ground surface. Therefore, for example, in the case of two high-pressure pump-equipment circuits, an inlet of the reservoir tank is kept distant and furthermore the foregoing expensive material is used for a pipe arrangement in the circuit, and therefore, an outlet of an ON/OFF valve 104 and an outlet of an ON/OFF valve 106 in FIG. 8 are joined to each other in the vicinity of the pumps disposed around the ground surface, and then, united into one uniting pipe arrangement 108 and connected to the reservoir tank. Furthermore, by opening and closing the ON/OFF valve 107 arranged near an outlet of the uniting pipe arrangement 108, the supply of ore slurry to the reservoir tank is controlled.

In this conventional slurry-transporting facility illustrated in FIG. 8, for example, in the case of an operation status in which a transport pump 101 of the pump-equipment circuit X is in an operating state, whereas a transport pump 102 of the pump-equipment circuit Y is in a waiting state, as a process of switchover between pumps to perform a maintenance inspection for the transport pump 101, in other words, a process of switchover from the pump-equipment circuit X to the pump-equipment circuit Y, the following operations are conducted.

That is, first, as Step S1, an ON/OFF valve 103 and the ON/OFF valve 104 in a pipe arrangement in the pump-equipment circuit X which is to be changed to a waiting state and the ON/OFF valve 107 in the uniting pipe arrangement 108 are switched from an open state to a closed state, and the transport pump 101 which is subject to a maintenance inspection is stopped. In other words, this operation allows the transportation of slurry to the reservoir tank as a transport destination to be completely stopped. Next, as Step S2, an ON/OFF valve 105 and the ON/OFF valve 106 in a pipe arrangement in the pump-equipment circuit Y which is to be changed into an operating state are switched from a closed state to an open state, and then, the transport pump 102 is operated. Next, as Step S3, when a pressure value detected by a pressure gauge 109 configured to measure a pressure in the uniting pipe arrangement 108 is larger than a pressure value detected by a pressure gauge 110 provided in the reservoir tank as a transport destination, the ON/OFF valve 107 provided in the uniting pipe arrangement 108 is switched from a closed state to an open state so that slurry transported via the pump-equipment circuit Y is made to flow into the reservoir tank.

In the conventional slurry-transporting facility, if the foregoing switchover control between the pump-equipment circuits, particularly, the pressure condition for the pressure gauge 109 and the pressure gauge 110 which is to be determined in Step S3 is not kept, contents flow backward from the reservoir tank and the pressure in the reservoir tank is decreased, and, as a result, operations are adversely affected.

However, during from the start of Step S1 to the end of Step S2, both the transport pump 101 and the transport pump 102 are in a stopped state, and, during from the start of Step S1 to the end of Step S3 (during the state of the ON/OFF valve 107 is switched from a closed state to an open state), the supply (hereinafter, also referred to as "feeding") of slurry to the reservoir tank is stopped.

Although there are some variations, the feeding is stopped for at least 1 to 2 minutes, usually for not less than 5 minutes. When the feeding of slurry is stopped, for example, in the case where the reservoir tank as a transport destination for the slurry is not so large, an interlock operates to protect a transport pump, and the transport pump itself is stopped. Furthermore, also in an autoclave configured to apply leaching processing to transported slurry, the addition of sulfuric acid to the autoclave needs to be stopped to protect a lining of the autoclave. In this case, downstream steps are also affected, and therefore, it takes at least a few hours or half a day to regain an original normal state, and accordingly, operation efficiency considerably decreases. Furthermore, when approximately 2 hours elapse after the supply of slurry is stopped, the autoclave needs to be cooled once from a viewpoint of facility protection, and therefore, it is necessary to stop the supply for approximately one day or longer. As a result, a shutdown operation (cooling) and a startup operation (heating) for the autoclave need to be performed additionally.

For example, Patent Document 2 discloses a technique for stably transporting a high-viscosity slurry at high pressure. However, this technique is to properly operate a high-pressure pump provided at some position in one circuit, and Patent Document 2 does not disclose a technique which makes it possible that, at the time of switchover between two high-pressure-pump-equipment circuits provided to be switched over for maintenance inspections and the like, a continuous operation (slurry supply) is performed with preventing the occurrence of a state in which the feeding is stopped. Furthermore, the slurry to be subject to the transport is wastewater sludge, human waste, purifying-tank sludge, crushed resin, and the like, and accordingly the technique does not offer high versatility for, for example, slurries which have different properties, such as viscosity, temperature, and pH (for example, the foregoing ore slurry of nickel oxide ore), and is not effectively applied thereto.

PRIOR-ART DOCUMENTS

Patent Documents

Patent document 1: Japanese Patent Application Laid-Open No. 2005-350766
Patent document 2: Japanese Patent Application Laid-Open No. 2003-326153

SUMMARY OF THE INVENTION

Problems to be Solved by the Invention

The present invention is proposed in view of such actual circumstances, and an object of the present invention is to provide a slurry-transporting facility and a slurry transportation control method, the slurry-transporting facility being equipped with a plurality of high-pressure-pump-equipment circuits and being capable of stably transporting slurry to a reservoir tank as a transport destination and also capable of performing efficient operations by preventing the occurrence of a stop of slurry supply to the transfer destination at the time of switchover between the pump-equipment circuits for use.

Means to Solve the Problems

The present inventors earnestly studied to achieve the above-mentioned object, and as a result, the inventors found that a pipe arrangement in each of pump-equipment circuits is equipped with a pressure gauge configured to measure a pressure in the pipe arrangement, whereby efficient slurry transportation control can be achieved and the occurrence of a stop of slurry supply at the time of switchover between the pump-equipment circuits can be prevented.

That is, a slurry-transporting facility according to the present invention is equipped with a plurality of pump-equipment circuits and configured to transport slurry from a feed tank to a reservoir tank provided with a pressure gauge via one of the plurality of pump-equipment circuits, and the slurry-transporting facility includes: pipe arrangements which branch out from the feed tank into the plurality of circuits; a transport pump provided in the pipe arrangement in each of the circuits; a first valve provided upstream from the transport pump in the pipe arrangement in each of the circuits; a second valve provided downstream from the transport pump in the pipe arrangement in each of the circuits; a uniting pipe arrangement formed by joining of the pipe arrangements of the respective circuits at a predetermined position downstream from the second valve and connected to the reservoir tank; a third valve provided in the uniting pipe arrangement and configured to control slurry transportation to the reservoir tank; and a pressure gauge provided upstream from the third valve in the uniting pipe arrangement and configured to measure a pressure in the uniting pipe arrangement, in which, in the pipe arrangement in each of the circuits, a pressure gauge configured to measure a pressure in the pipe arrangement is provided at a position downstream from the transport pump and upstream from the second valve.

Here, in the foregoing slurry-transporting facility, the plurality of pump-equipment circuits are used by switchover between the circuits, and a transport pump provided in a pipe arrangement in one of the plurality of the circuits is made into an operating state, and transport pumps provided in pipe arrangements in the other circuits are made into a waiting state.

Furthermore, a slurry transportation control method according to the present invention is executed using a slurry-transporting facility equipped with a plurality of pump-equipment circuits and configured to transport slurry from a feed tank to a reservoir tank provided with a pressure gauge via one of the plurality of pump-equipment circuits, and the slurry-transporting facility includes: pipe arrangements which branch out from the feed tank into the plurality of circuits; a transport pump provided in the pipe arrangement in each of the circuits; a first valve provided upstream from the transport pump in the pipe arrangement in each of the circuits; a second valve provided downstream from the transport pump in the pipe arrangement in each of the circuits; a uniting pipe arrangement formed by joining of the pipe arrangements of the respective circuits at a predetermined position downstream from the second valve and connected to the reservoir tank; a third valve provided in the uniting pipe arrangement and configured to control slurry transportation to the reservoir tank; and a pressure gauge provided upstream from the third valve in the uniting pipe arrangement and configured to measure a pressure in the uniting pipe arrangement, in which, in the pipe arrangement in each of the circuits, a pressure gauge configured to measure a pressure in the pipe arrangement is provided at a position downstream from the transport pump and upstream from the second valve, and in which the plurality of pump-equipment circuits are used by switchover between the circuits, and, at the time of switchover from a first of the pump-equipment circuits which has a transport pump in an operating state to a second of the pump-equipment circuits, to transport slurry via the second pump-equipment circuit, the steps are executed in order: opening the first valve provided in the pipe arrangement in the second circuit; switching the transport pump in the second circuit to an operating state to operate the pump; opening the second valve provided in the pipe arrangement in the second circuit after a value detected by the pressure gauge provided downstream from the transport pump in the pipe arrangement in the second circuit becomes larger than a value detected by the pressure gauge provided in the uniting pipe arrangement; closing the second valve provided in the pipe arrangement of the first circuit; stopping the transport pump of the first circuit to make the pump into a waiting state; and closing the first valve provided in the pipe arrangement in the first circuit.

Furthermore, a slurry transportation control method according to the present invention is executed by a slurry-transporting facility equipped with a plurality of pump-equipment circuits and configured to transport slurry from a feed tank to a reservoir tank provided with a pressure gauge via one of the plurality of pump-equipment circuits, and the slurry-transporting facility includes: pipe arrangements which branch out from the feed tank into the plurality of circuits; a transport pump provided in the pipe arrangement in each of the circuits; a first valve provided upstream from the transport pump in the pipe arrangement in each of the circuits; a second valve provided downstream from the transport pump in the pipe arrangement in each of the circuits; a uniting pipe arrangement formed by joining of the pipe arrangements of the respective circuits at a predetermined position downstream from the second valve and connected to the reservoir tank; a third valve provided in the uniting pipe arrangement and configured to control slurry transportation to the reservoir tank; and a pressure gauge provided upstream from the third valve in the uniting pipe arrangement and configured to measure a pressure in the uniting pipe arrangement, in which, in the pipe arrangement in each of the circuits, a pressure gauge configured to measure a pressure in the pipe arrangement is provided at a position downstream from the transport pump and upstream from the second valve, and in which the plurality of pump-equipment circuits are used by switchover between the circuits, and, at the time of switchover from a first of the pump-equipment circuits which has the transport pump in an operating state to a second of the pump-equipment circuits, to transport slurry via the second pump-equipment circuit, the steps are executed in order: opening the first valve provided in the pipe arrangement in the second circuit; switching the transport pump in the second circuit to an operating state to operate the pump; opening the second valve provided in the pipe arrangement in the second circuit after a value detected by the pressure gauge provided downstream from the transport pump in the pipe arrangement in the second circuit becomes larger than a value detected by the pressure gauge provided in the uniting pipe arrangement and the value detected by the pressure gauge provided in the pipe arrangement in the second circuit becomes larger than a value detected by the pressure gauge provided in the pipe arrangement in the first circuit; closing the second valve provided in the pipe arrangement in the first circuit; stopping the transport pump in the first circuit to make the pump into a waiting state; and closing the first valve provided in the pipe arrangement in the first circuit.

Here, in the slurry-transporting facility and the slurry transportation control method, as the slurry, there may be used an ore slurry which is obtained by wet-grinding and sieving a nickel oxide ore to attain a grain size adjusted as predetermined.

Effects of the Invention

The present invention enables slurry to be stably transported to a reservoir tank as a transport destination with preventing backflow of the slurry, and can prevent occurrence of a stop of slurry supply to the transport destination even at the time of switchover between pump-equipment circuits for use, and thus makes it possible to perform efficient operations.

DETAILED DESCRIPTION OF THE INVENTION

Figure 1:
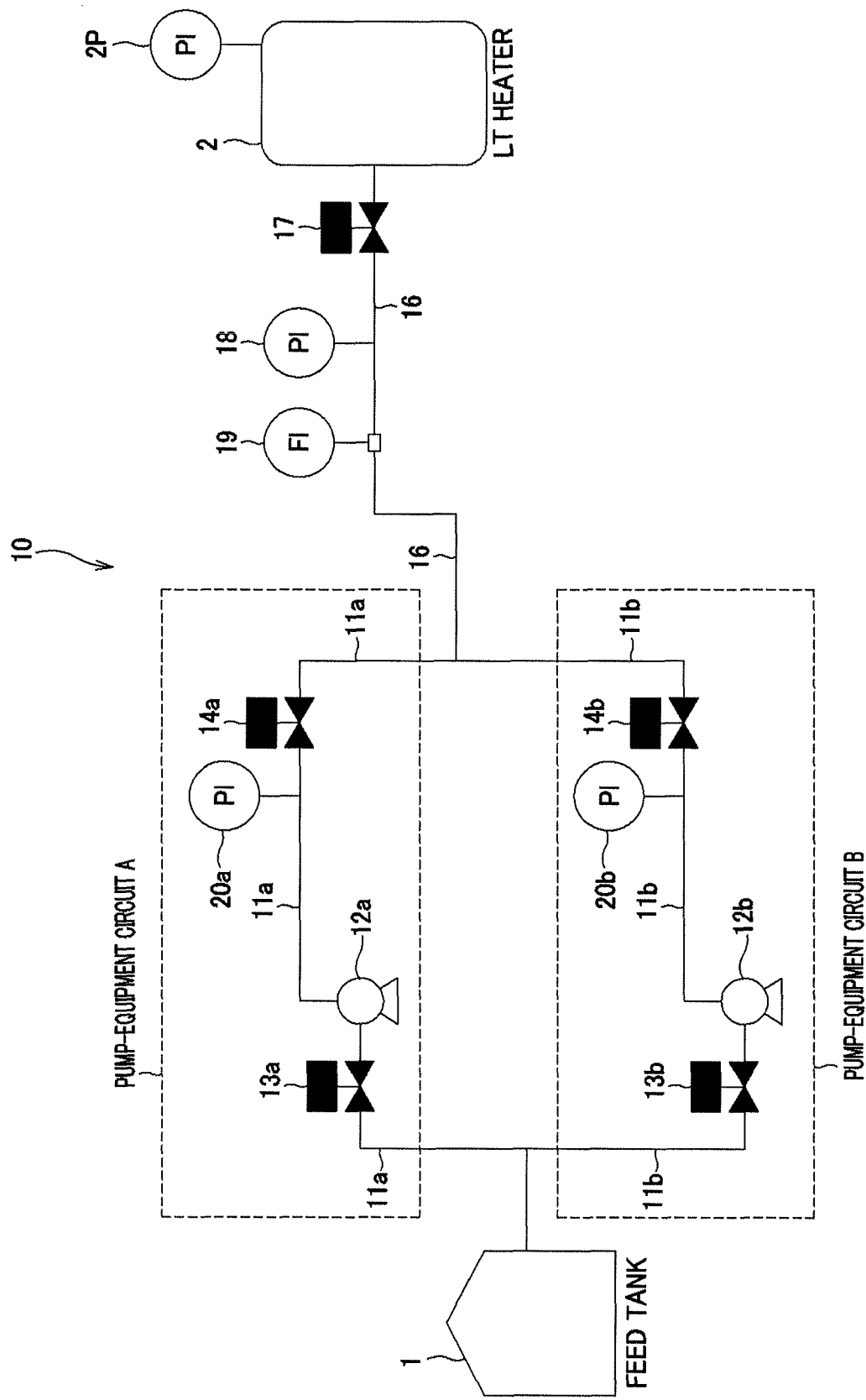
FIG. 1 is a schematic diagram of a slurry-transporting facility equipped with two pump-equipment circuits.

Hereinafter, the slurry-transporting facility according to the present invention and the slurry transportation control method using the slurry-transporting facility will be described in detail in the following order. It should be noted that the present invention is not limited to the following embodiment, and various changes can be made within the scope not deviating from the gist of the present invention.

1. Outline of the present invention
2. Slurry-transporting facility
2-1. First embodiment
2-2. Second embodiment (in the case of pump-equipment circuits each having not less than two contiguous high-pressure pumps)
3. Slurry transportation method (transportation control method)
3-1. First embodiment
   3-1-1. Startup operation at the time of starting (or after shutdown)
   3-1-2. Switchover process between pump-equipment circuits
   (1)
   3-1-3. Switchover process between pump-equipment circuits
   (2) (Modified Example)
   3-2. Second embodiment (in the case of pump-equipment circuits each having not less than two contiguous high-pressure pumps)
   3-2-1. Startup operation at the time of starting (or after shutdown)
   3-2-2. Switchover process between pump-equipment circuits
4. Examples

1. Outline of the Present Invention

The slurry-transporting facility according to the present invention is used as, for example, an ore-slurry-transporting facility used in a hydrometallurgical process by high pressure acid leach (HPAL) for nickel oxide ore. Specifically, this slurry-transporting facility is applied to an ore-slurry-heating-and-pressurizing facility configured such that, in a leaching step of a hydrometallurgical process for nickel, a nickel oxide ore is wet-grinded and sieved to obtain an ore slurry having a grain size adjusted as predetermined, and the thus-obtained ore slurry is made to pass through heaters provided in multiple stages, thereby being heated and pressurized step by step.

This slurry-transporting facility is equipped with a plurality of pump-equipment circuits, and, via one of the plurality of pump-equipment circuits, transports slurry from a feed tank of slurry (for example, a slurry feed tank) to a reservoir tank (for example, a heater) provided with a pressure gauge.

For example, in the foregoing ore slurry transporting facility used in the hydrometallurgical process for nickel, the pump-equipment circuits are operated under the strict conditions of temperature, pressure, pH, and the like. Therefore, the pump-equipment circuits need to undergo periodic maintenance inspections. This slurry-transporting facility is equipped with a plurality of pump-equipment circuits and the pump-equipment circuits are used by switchover between the circuits, whereby it is made possible that only one of the pump-equipment circuits is operated and other pump-equipment circuits undergo a periodic maintenance inspection. Thus, even at the time of maintenance inspections, a stop of the operation of the whole of the transporting facility is avoided.

Specifically, the slurry-transporting facility according to the present invention includes: pipe arrangements which branch out from the feed tank into the plurality of circuits; a transport pump provided in the pipe arrangement in each of the circuits; a first valve provided upstream from the transport pump in the pipe arrangement in each of the circuits; a second valve provided downstream from the transport pump in the pipe arrangement in each of the circuits; a uniting pipe arrangement formed by joining of the pipe arrangements of the respective circuits at a predetermined position and connected to the reservoir tank; a third valve provided in the uniting pipe arrangement and configured to control slurry transportation to the reservoir tank; and a pressure gauge provided upstream from the third valve in the uniting pipe arrangement and configured to measure a pressure in the uniting pipe arrangement. Furthermore, the slurry-transporting facility is characterized in that, in the pipe arrangement in each of the circuits, a pressure gauge configured to measure a pressure in the pipe arrangement is provided at a position downstream from the transport pump and upstream from the second valve.

The conventional slurry-transporting facility is equipped with a plurality of pump-equipment circuits, but, at the time of switchover between the pump-equipment circuits, in other words, at the time of switchover, for example, in such a manner that a pump-equipment circuit X in operation is stopped and a pump-equipment circuit Y in a shutdown state is operated, the supply (feeding) of slurry to the reservoir tank as a transfer destination is stopped for several hours. Furthermore, when the supply of slurry is thus stopped, the addition of sulfuric acid to an autoclave which is an apparatus used for downstream leaching processing needs to be stopped, and therefore, downstream processes are also affected, and accordingly, it takes at least a few hours or half a day to regain an original normal state. As a result, slurry transportation efficiency considerably decreases, and the autoclave apparatus itself is adversely affected.

Furthermore, such stop of slurry supply not only causes unstable downstream processes, but also naturally causes a stop of processing in the downstream processes, and accordingly, the operation efficiency of the whole of processes also decreases, and furthermore, such a situation is also caused that processing conditions in the downstream processes have to be changed.

On the other hand, the slurry-transporting facility and the slurry transportation control method using the slurry-transporting facility according to the present invention make it possible that, even at the time of switchover between a plurality of the pump-equipment circuits, slurry is stably transported and occurrence of a stop of the transportation of slurry to a transport destination can be prevented, whereby a decrease in slurry transportation efficiency and a decrease in operation efficiency of the whole of processes can be prevented.

Hereinafter, a specific embodiment of the slurry-transporting facility and the slurry transportation control method using the slurry-transporting facility according to the present invention will be more specifically described with reference to the drawings. It should be noted that, hereinafter, as a specific example, there will be mentioned a case where the slurry-transporting facility according to the present invention is applied to an ore-slurry-heating-and-pressurizing facility configured such that a nickel oxide ore whose grain size is adjusted by wet processing is made to pass through heaters provided in multiple stages (for example, LT heater, MT heater, HT heater), thereby being heated and pressurized step by step, and a transportation control method for transporting ore slurry to the heaters will be described, but, the present invention is not limited to this.

2. Slurry-Transporting Facility

2-1. First Embodiment

FIG. 1 is a schematic diagram illustrating a pipe arrangement configuration of a slurry-transporting facility 10 according to a first embodiment. As illustrated in FIG. 1, the slurry-transporting facility 10 constitutes a space between a feed tank 1 configured to supply ore slurry obtained by adjusting a nickel oxide ore to have a predetermined grain size and a LT (Low Temperature) heater 2 serving as a transport destination for the supplied ore slurry. In this slurry-transporting facility 10, it is necessary that, with preventing backflow of the ore slurry supplied from the feed tank 1, the ore slurry is surely transported to the LT heater 2.

As mentioned above, the feed tank 1 is a tank configured to store ore slurry which is adjusted to have a predetermined grain size and to supply the ore slurry to the slurry-transporting facility 10, and thus the ore slurry is supplied and transported from this feed tank 1 to the slurry-transporting facility 10.

The LT heater 2 is a tank configured to store ore slurry transported via the slurry-transporting facility 10, and in the tank, heating processing (to raise the temperature of the slurry to, for example, approximately 40 to 100° C.) is applied to the transported ore slurry. This LT heater 2 is equipped with a pressure gauge 2P configured to detect a pressure in the heater, and detects a pressure increasing with the heating processing.

The slurry-transporting facility 10 is equipped with two pump-equipment circuits (a pump-equipment circuit A, a pump-equipment circuit B), and, via one of the two pump-equipment circuits, ore slurry supplied from the feed tank 1 is transported to the LT heater 2. That is, the slurry-transporting facility 10 uses the two pump-equipment circuits by switchover between the circuits, and thus, one of the pump-equipment circuits is made into an operating state so as to pump and transport ore slurry, whereas the other pump-equipment circuit is in a waiting state so as to be ready to undergo a periodic (repair) inspection and the like.

Specifically, the slurry-transporting facility 10 includes: pipe arrangements 11a and 11b which branch out from the feed tank 1 into the two circuits; transport (feed) pumps 12a and 12b formed in the pipe arrangements 11a and 11b, respectively; first valves 13a and 13b provided upstream from the transport pumps 12a and 12b in the pipe arrangements 11a and 11b, respectively; second valves 14a and 14b provided downstream from the transport pumps 12a and 12b in the pipe arrangements 11a and 11b, respectively; and a uniting pipe arrangement 16 formed by joining of the pipe arrangements 11a and 11b at a predetermined position downstream from the second valves 14a and 14b and connected to the LT heater 2. Furthermore, the uniting pipe arrangement 16 is provided with: a third valve 17 configured to control ON/OFF for the transportation of ore slurry to the LT heater 2; and a pressure gauge 18 provided upstream from the third valve 17 and configured to measure a pressure in the uniting pipe arrangement 16. It should be noted that, as illustrated in FIG. 1, the uniting pipe arrangement 16 may be provided with a flowmeter 19 configured to measure a flow rate of ore slurry flowing through the uniting pipe arrangement 16.

Furthermore, this slurry-transporting facility 10 is characterized in that, in the pipe arrangements 11a and 11b of the respective circuits, pressure gauges 20a and 20b configured to measure pressures inside the respective pipe arrangements 11a and 11b are provided at positions downstream from the transport pumps 12a and 12b and upstream from the second valves 14a and 14b, respectively.

It should be noted that the wording "upstream" and "downstream" mentioned in this specification are expressed by regarding the direction of a supply source as "upstream" and the direction of a transport destination as "downstream", based on the direction of the transportation flow of ore slurry.

The pipe arrangements 11a and 11b each serve as a flow path of ore slurry passing through each of the pump-equipment circuits (pump-equipment circuit A, pump-equipment circuit B) and are formed in such a way that pipe arrangements connected to the feed tank 1 branch out. As mentioned above, the two pump-equipment circuits are switched over to each other and used by turns, and thus, the transportation of ore slurry which passes through each of the pipe arrangements 11a and 11b is controlled.

The transport (feed) pumps 12a and 12b are high-pressure pumps configured to apply a high pressure to ore slurry flowing through the respective pipe arrangements 11a and 11b to perform pump-transportation of the ore slurry. As mentioned above, the transport pumps 12a and 12b are disposed in the vicinity of the ground surface and, in many cases, kept at some distance from the LT heater as a transport destination. In this slurry-transporting facility 10, it is important that, using the transport pumps 12a and 12b, ore slurry is surely transported to the LT heater 2 with preventing backflow of the slurry.

The transport pumps 12a and 12b are capable of becoming in two kinds of states, namely, an operating state (working state) and a waiting state (shutdown state), and the transport pump provided in the pump-equipment circuit in an operating state is in a working state, on the other hand, the transport pump provided in the pump-equipment circuit in a waiting state is in a shutdown state. It should be noted that, when the pump-equipment circuit is in a waiting state, the transport pump provided in this pump-equipment circuit undergoes a periodic (maintenance) inspection.

The first valves 13a and 13b are ON/OFF valves configured to perform a transportation control being such that ore slurry supplied from the feed tank 1 is transported in the directions of the transport pumps 12a and 12b provided downstream from first valves 13a and 13b, respectively.

Specifically, when the first valves 13a and 13b are in an open state (ON state), ore slurry is transported in the respective directions of the transport pumps 12a and 12b, on the other hand, when the first valves 13a and 13b are in a closed state (OFF state), the transportation of ore slurry in the respective directions of the transport pumps 12a and 12b is stopped.

The second valves 14a and 14b are ON/OFF valves configured to perform transportation control being such that ore slurry which is pumped and transported from the transport pumps 12a and 12b provided upstream from the second valves 14a and 14b, respectively, is transported in the direction of the later-mentioned uniting pipe arrangement 16 and furthermore the LT heater 2 as a transport destination for ore slurry. Specifically, when the second valves 14a and 14b are in an open state (ON state), ore slurry is transported in the direction of the uniting pipe arrangement 16, on the other hand, when the second valves 14a and 14b are in a closed state (OFF state), the transportation of ore slurry in the direction of the uniting pipe arrangement 16 is stopped.

In the pipe arrangements 11a and 11b of the respective circuits, the pressure gauges 20a and 20b are provided at positions downstream from the transport pumps 12a and 12b and upstream from the second valves 14a and 14b, respectively. The pressure gauges 20a and 20b are configured to detect the respective pressures in the pipe arrangements 11a and 11b, the pressures varying with the pump-transportation of ore slurry at high pressure by the transport pumps 12a and 12b. In the present embodiment, such provision of the pressure gauges 20a and 20b is important, and enables accurate detection of pressures in the pipe arrangements 11a and 11b of the respective circuits, and furthermore, makes it possible to make a comparison between pressure values detected by pressure gauges 20a and 20b and a pressure value detected by the pressure gauge 18 provided in the uniting pipe arrangement 16.

Furthermore, although described later in detail, in the present embodiment, pressure values detected by the pressure gauges 20a and 20b are compared to a pressure value detected by the pressure gauge 18 provided in the uniting pipe arrangement 16, and whether the pressure values detected by the pressure gauges 20a and 20b are larger or not is determined, whereby ore slurry transportation control with switchover between the pump-equipment circuits for use is conducted.

The uniting pipe arrangement 16 is one pipe arrangement formed by joining of the pipe arrangements 11a and 11b of the respective circuits at a predetermined position (a coupling point 15) downstream from the second valves 14a and 14b, and is connected to the LT heater 2. Into the uniting pipe arrangement 16, ore slurry transported from any one of the pump-equipment circuits is made to flow, and the uniting pipe arrangement 16 serves as a flow path to transport the ore slurry to the LT heater 2. As mentioned above, the inflow of ore slurry into the uniting pipe arrangement 16 is controlled by the second valves 14a and 14b provided, respectively, in the pipe arrangements 11a and 11b of the respective circuits.

Furthermore, the uniting pipe arrangement 16 is equipped with: a third valve 17 configured to control the transportation of ore slurry to the LT heater 2; and a pressure gauge 18 provided upstream from the third valve 17 and configured to measure a pressure in the uniting pipe arrangement 16.

The third valve 17 is an ON/OFF valve configured to perform transportation control being such that ore slurry passing through the uniting pipe arrangement 16 is transported to the LT heater 2. Specifically, when the third valve 17 is in an open state (ON state), ore slurry is transported to the LT heater 2, on the other hand, when the third valve 17 is in a closed state (OFF state), the transportation of ore slurry to the LT heater 2 is stopped.

The pressure gauge 18 is configured to detect a pressure in the uniting pipe arrangement 16. At the time of a first startup of the slurry-transporting facility 10 (a startup at starting or after shutdown), a pressure value detected by the pressure gauge 18 and a pressure value detected by the pressure gauge 2P provided in the LT heater 2 serving as a transport destination for ore slurry are compared, whereby the transportation of ore slurry passing through the uniting pipe arrangement 16 to the LT heater 2 is controlled.

As mentioned above, at a position downstream from the transport pumps 12a and 12b and upstream from the second valves 14a and 14b in the pipe arrangements 11a and 11b in the respective circuits, the slurry-transporting facility 10 is equipped with the pressure gauges 20a and 20b configured to measure pressures in the pipe arrangements 11a and 11b, respectively. According to the slurry-transporting facility 10 having such configuration, pressures in the pipe arrangements 11a and 11b in the respective circuits can be measured, and furthermore, pressures in the pipe arrangements 11a and 11b can be compared with a pressure in the uniting pipe arrangement 16, and therefore ore slurry can be stably transported to the LT heater 2 (liquid-transportation at high pressure) with preventing backflow of the slurry. Accordingly, also in the case where a plurality of the pump-equipment circuits are used by switchover between the circuits, the transportation of ore slurry to the LT heater 2 can be prevented from being stopped at the time of the switchover, and thus a decrease in operation efficiency can be prevented.

2-2. Second Embodiment (in the Case of Pump-Equipment Circuits Each Having not Less than Two Contiguous High-Pressure Pumps)

Figure 2:
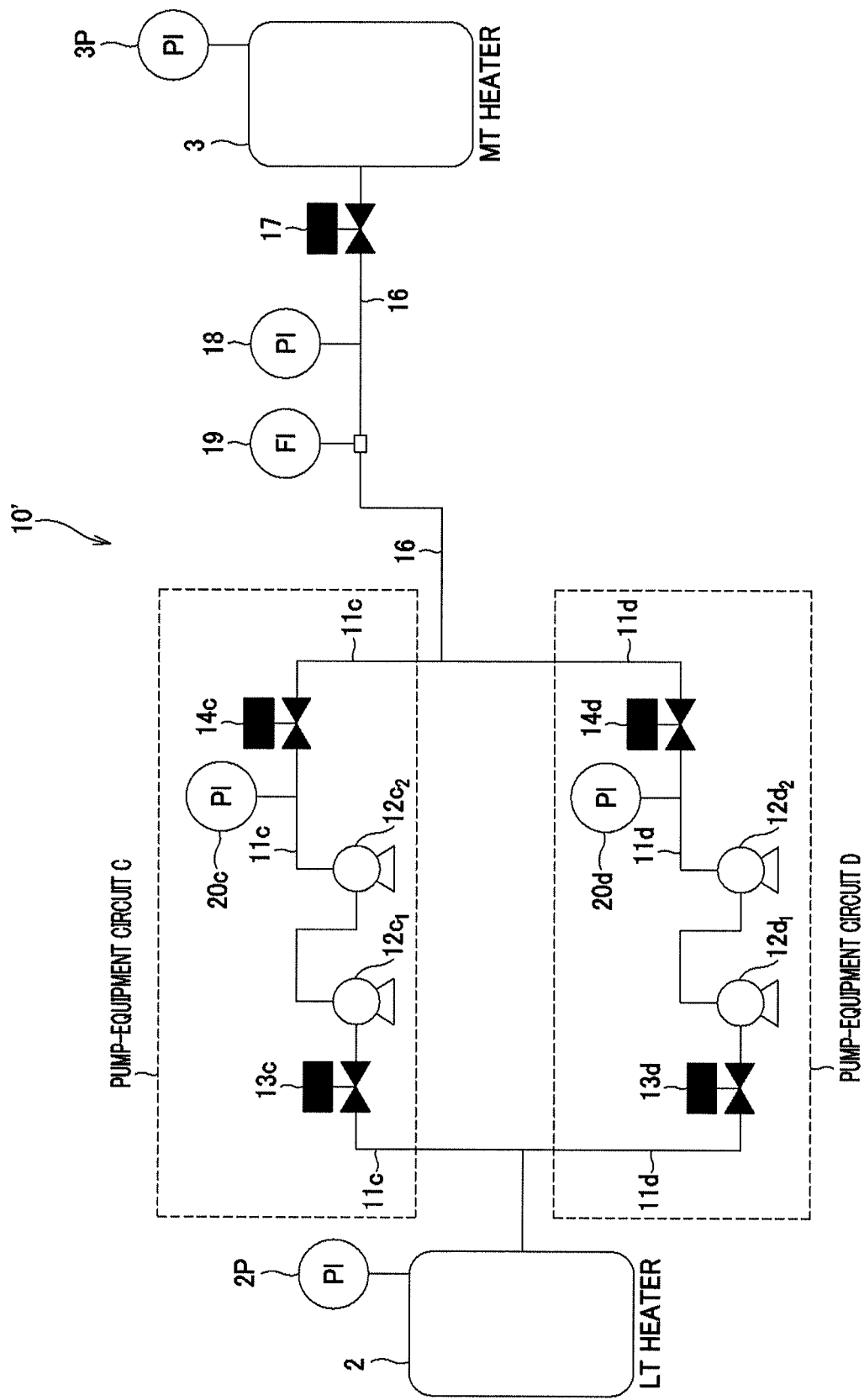
FIG. 2 is a schematic diagram of a slurry-transporting facility equipped with two pump-equipment circuits each having two contiguous high-pressure pumps.

FIG. 2 is a schematic diagram illustrating a pipe arrangement configuration of a slurry-transporting facility 10' according to a second embodiment. As illustrated in FIG. 2, the slurry-transporting facility 10' constitutes a space between a LT (Low Temperature) heater 2 configured to heat ore slurry to a predetermined temperature and supply the slurry and an MT (Middle Temperature) heater 3 serving as a transport destination for the supplied ore slurry. Also in this slurry-transporting facility 10', as is the case with the foregoing slurry-transporting facility 10 according to the first embodiment, it is necessary that, with preventing backflow of the ore slurry supplied from the LT heater 2, the slurry is surely transported to the MT heater 3.

As mentioned above, the LT heater 2 is a tank configured to store ore slurry, and in the tank, heating processing is applied to the ore slurry. Then, the ore slurry heated in the LT heater 2 is supplied and transported to the slurry-transporting facility 10'.

The MT heater 3 is a tank configured to store ore slurry transported via the slurry-transporting facility 10', and in the tank, heating processing (to raise the temperature of the slurry to, for example, approximately 100 to 150° C.) is applied to the transported ore slurry. This MT heater 3 is equipped with a pressure gauge 3P configured to detect a pressure in the heater, and detects a pressure increasing with the heating processing.

It should be noted that the foregoing slurry-transporting facility 10 according to the first embodiment and this slurry-transporting facility 10' according to the second embodiment are continuously linked via the LT heater 2, and constitute a transportation path to raise the temperature of ore slurry step by step (for example, three steps) in high-pressure acid leach processing in a nickel refining process. Therefore, ore slurry transported in the slurry-transporting facility 10' has a higher temperature and a higher pressure than ore slurry transported in the slurry-transporting facility 10 according to the first embodiment.

The slurry-transporting facility 10' is equipped with two pump-equipment circuits (pump-equipment circuit C, pump-equipment circuit D), and, via one of the two pump-equipment circuits, ore slurry supplied from the LT heater 2 is transported to the MT heater 3. That is, the slurry-transporting facility 10' uses the two pump-equipment circuits by switchover between the circuits, and one of the pump-equipment circuits is made into an operating state so as to pump and transport ore slurry, whereas the other pump-equipment circuit is made into a waiting state so as to be ready to undergo a periodic (repair) inspection and the like.

Furthermore, in the slurry-transporting facility 10', the pump-equipment circuits each are equipped with two transport pumps which are continuously linked (two contiguous transport pumps) ($12c_1$, $12c_2$) and ($12d_1$, $12d_2$), respectively. As mentioned above, each of the circuits is equipped with not less than two contiguous transport pumps, whereby it is made possible to effectively transport even an ore slurry whose temperature is raised and whose pressure is increased.

Specifically, the slurry-transporting facility 10' includes: pipe arrangements 11c and 11d which branch out from the LT heater 2 into the two circuits; two contiguous transport pumps ($12c_1$, $12c_2$) and ($12d_1$, $12d_2$) provided in the respective pipe arrangements 11c and 11d; first valves 13c and 13d provided upstream from the transport pumps $12c_1$ and $12d_1$ in the pipe arrangements 11c and 11d, respectively; second valves 14c and 14d provided downstream from the transport pumps $12c_2$ and $12d_2$ in the pipe arrangements 11c and 11d, respectively; and a uniting pipe arrangement 16 formed by joining of the pipe arrangements 11c and 11d at a predetermined position downstream from the second valves 14c and 14d and connected to the MT heater 3. Furthermore, the uniting pipe arrangement 16 is provided with: a third valve 17 configured to control the transportation of ore slurry to the MT heater 3; and a pressure gauge 18 provided upstream from the third valve 17 and configured to measure a pressure in the uniting pipe arrangement 16. It should be noted that, as illustrated in FIG. 2, the uniting pipe arrangement 16 may be provided with a flowmeter 19 configured to measure a flow rate of ore slurry flowing through the uniting pipe arrangement 16.

Furthermore, this slurry-transporting facility 10' is characterized in that, in the pipe arrangements 11c and 11d of the respective circuits, pressure gauges 20c and 20d configured to measure pressures inside the respective pipe arrangements 11c and 11d are provided at positions downstream from the transport pumps $12c_2$ and $12d_2$ and upstream from the second valves 14c and 14d, respectively.

The transport pumps ($12c_1$, $12c_2$) and ($12d_1$, $12d_2$) are high-pressure pump apparatuses configured to apply a high pressure to ore slurry flowing via the respective pipe arrangements 11c and 11d to perform pump-transportation of the slurry. The two contiguous transport pumps (for example, $12c_1$ and $12c_2$) provided in the pipe arrangement (for example, 11c) in one of the circuits are simultaneously controlled to be made into an operating state (working state) or a waiting state (shutdown state), whereby the pump-transportation of ore slurry which passes through the pipe arrangement 11c is controlled. It should be noted that, when a pump-equipment circuit is in a waiting state, transport pumps of the pump-equipment circuit undergo a periodic (maintenance) inspection.

It should be noted that components which are common to the slurry-transporting facility 10' and the slurry-transporting facility 10 according to the first embodiment are assigned the same reference symbols, and detailed descriptions of those components in the slurry-transporting facility 10' will be omitted.

As mentioned above, also in the slurry-transporting facility 10' in which each of the circuits is equipped with not less than two contiguous transport pumps, pressure gauges 20c and 20d configured to measure pressures in the pipe arrangements 11c and 11d in the respective circuits are provided at the respective positions downstream from the transport pumps $12c_2$ and $12d_2$ and upstream from the second valves 14c and 14d in the pipe arrangements 11c and 11d in the respective circuits, whereby pressures in the pipe arrangements 11c and 11d of the respective circuits can be measured, and furthermore, pressures in the pipe arrangements 11c and 11d can be compared with a pressure in the uniting pipe arrangement 16. Such configuration enables ore slurry to be stably transported (liquid transport at high pressure) to the MT heater 3 with preventing backflow of the ore slurry, and accordingly, also in the case where a plurality of the pump-equipment circuits are used by switchover between the circuits, the transportation of ore slurry to the MT heater 3 can be prevented from being stopped at the time of the switchover, and thus a decrease in operation efficiency can be prevented.

3. Slurry Transportation Method (Transportation Control Method)

Next, ore slurry transportation methods (transportation control methods) using the foregoing slurry-transporting facilities 10 and 10' will be described.

3-1. First Embodiment

As a first embodiment, an ore slurry transportation control method using the slurry-transporting facility 10 whose configuration example is illustrated in FIG. 1 will be described. As mentioned above, the slurry-transporting facility 10 is equipped with two pump-equipment circuits (pump-equipment circuit A, pump-equipment circuit B), and is configured to use the two pump-equipment, circuits by suitable switchover between the circuits and transport ore slurry supplied from the feed tank 1 to the LT heater 2 (liquid-transportation at high pressure).

Here, in the slurry-transporting facility 10, it is important that, with preventing ore slurry to be transported from flowing backward in a flow path, the slurry is surely transported to the LT heater 2 as a transport destination. Ore slurry to be transported has undergone processing under high temperature, high pressure, and the like, and therefore, if the slurry flows backward during the transportation, a trouble in each of the ON/OFF valves and the high-pressure pumps provided in the pipe arrangement could be caused. Furthermore, as mentioned above, at the time of switchover between the two pump-equipment circuits, it is desired that, without such a stop of slurry supply that has been caused in a conventional slurry-transporting facility, slurry is continuously supplied to a transport destination. This allows efficient operation.

<3-1-1. Startup Operation at the Time of Starting (or after Shutdown)>

Figure 3:
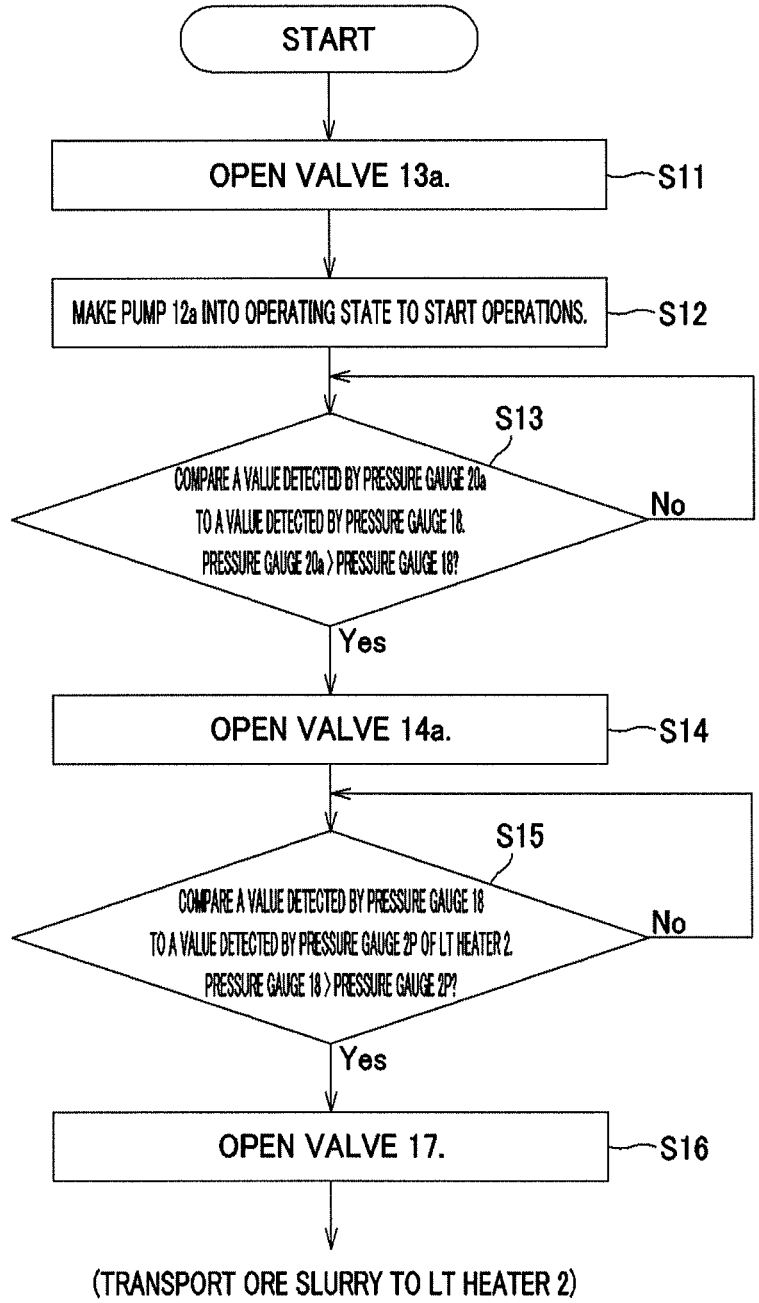
FIG. 3 is a flowchart illustrating a flow of an operation at the time of start (a first startup) of the transportation of slurry in a slurry-transporting facility.

First, an operation at the time of starting ore slurry transportation using the slurry-transporting facility 10, in other words, a startup operation at a first starting or after shutdown will be described. Specifically, FIG. 3 illustrates the flow (control flow) of an operation at the time of starting the transportation of ore slurry by the slurry-transporting facility 10. It should be noted that the flow illustrated in FIG. 3 shows an example of the transportation of ore slurry from the feed tank 1 to the LT heater 2 by operating the pump-equipment circuit A out of the two pump-equipment circuits, at the time of the first starting.

First, as Step S11, the first valve 13a provided in the pipe arrangement 11a in the pump-equipment circuit A is opened. This allows ore slurry supplied from the feed tank 1 to flow into the pipe arrangement 11a in the pump-equipment circuit A. It should be noted that, in Step S11, in the case where, after a lapse of a certain time, the first valve 13a is still not opened properly, a return to an initial state is made from a viewpoint of facility protection. The initial state means a state before starting (shutdown of a pump, closing of a valve, and the like).

Subsequently, as Step S12, the transport pump 12a provided downstream from the first valve 13a in the pipe arrangement 11a is made into an operating state to start operating. Then, high-pressure pump-transportation by the transport pump 12a is started, whereby ore slurry flowing into the pipe arrangement 11a is transported downstream. It should be noted that, in Step S12, in the case where, after a lapse of a certain time, the transport pump 12a still does not become in an operating state property, a return to an initial state is made from a viewpoint of facility protection.

Next, in Step S13, a pressure value detected by the pressure gauge 20a configured to detect a pressure in the pipe arrangement 11a into which ore slurry is transported at high pressure by the transport pump 12a is compared to a pressure value detected by the pressure gauge 18 configured to detect a pressure in the uniting pipe arrangement 16, and it is determined whether or not the pressure value detected by the pressure gauge 20a is larger than the pressure value detected by the pressure gauge 18 (Pressure 20a>Pressure 18?). In this Step S13, when the pressure value detected by the pressure gauge 20a is determined to be larger (when it is determined Yes), then the operation proceeds to Step S14. On the contrary, when the pressure value detected by the pressure gauge 20a is determined to be equal to or smaller than the pressure value detected by the pressure gauge 18 (when it is determined No), the determination process in Step S13 is repeated. It should be noted that, in Step S13, in the case where, after a lapse of a certain time, the state "Pressure 20a>Pressure 18" is still not attained, a return to an initial state is made from a viewpoint of facility protection.

In Step S14, since the pressure value detected by the pressure gauge 20a has been determined to be larger than the pressure value detected by the pressure gauge 18 in Step 13, the second valve 14a provided downstream from the pressure gauge 20a in the pipe arrangement 11a is opened. Then, ore slurry passing through the pipe arrangement 11a is made to flow into the uniting pipe arrangement 16 by high-pressure transportation using the transport pump 12a. It should be noted that, in Step S14, in the case where, after a lapse of a certain time, the second valve 14a is still not opened properly, a return to an initial state is made from a viewpoint of facility protection.

Next, in Step S15, a pressure value detected by the pressure gauge 18 configured to detect a pressure in the uniting pipe arrangement 16 is compared to a pressure value detected by the pressure gauge 2P provided in the LT heater 2 serving as a transport destination for ore slurry (a pressure value in the LT heater 2), and it is determined whether or not the pressure value detected by the pressure gauge 18 is larger than the pressure value detected by the pressure gauge 2P (Pressure 18>Pressure 2P?). In Step S15, when the pressure value detected by the pressure gauge 18 is determined to be larger (when it is determined Yes), then the operation proceeds to Step S16. On the contrary, when the pressure value detected by the pressure gauge 18 is determined to be equal to or smaller than the pressure value detected by the pressure gauge 2P (when it is determined No), the determination process in Step S15 is repeated again. It should be noted that, in Step S15, in the case where, after a lapse of a certain time, the state "Pressure 18>Pressure 2P" is still not attained, a return to an initial state is made from a viewpoint of facility protection.

In Step S16, since the pressure value detected by the pressure gauge 18 has been determined to be larger than the pressure value detected by the pressure gauge 2P in Step 15, the third valve 17 provided downstream from the pressure gauge 18 in the uniting pipe arrangement 16 is opened. Then, ore slurry passing through the uniting pipe arrangement 16 is transported to the LT heater 2 by high-pressure transportation using the pump-equipment circuit A. It should be noted that, in Step S16, in the case where, after a lapse of a certain time, the third valve 17 is still not opened properly, a return to an initial state is made, from a viewpoint of facility protection.

As mentioned above, at the time of start of the transportation by the slurry-transporting facility 10 (at the time of startup), with performing a comparison between a pressure value detected by the pressure gauge 20a and a pressure value detected by the pressure gauge 18 and a comparison between a pressure value detected by the pressure gauge 18 and a pressure value detected by the pressure gauge 2P in the LT heater 2, opening-and-closing control for the ON/OFF valves provided downstream from the respective pressure gauges is performed to control the transportation of ore slurry. Thus, the transportation can be carried out while it is appropriately confirmed that a pressure on the downstream side to which ore slurry is to be transported is lower, and, without backflow of ore slurry, the slurry can be stably transported to the LT heater 2.

<3-1-2. Switchover Process Between Pump-Equipment Circuits (1)>

Figure 4:
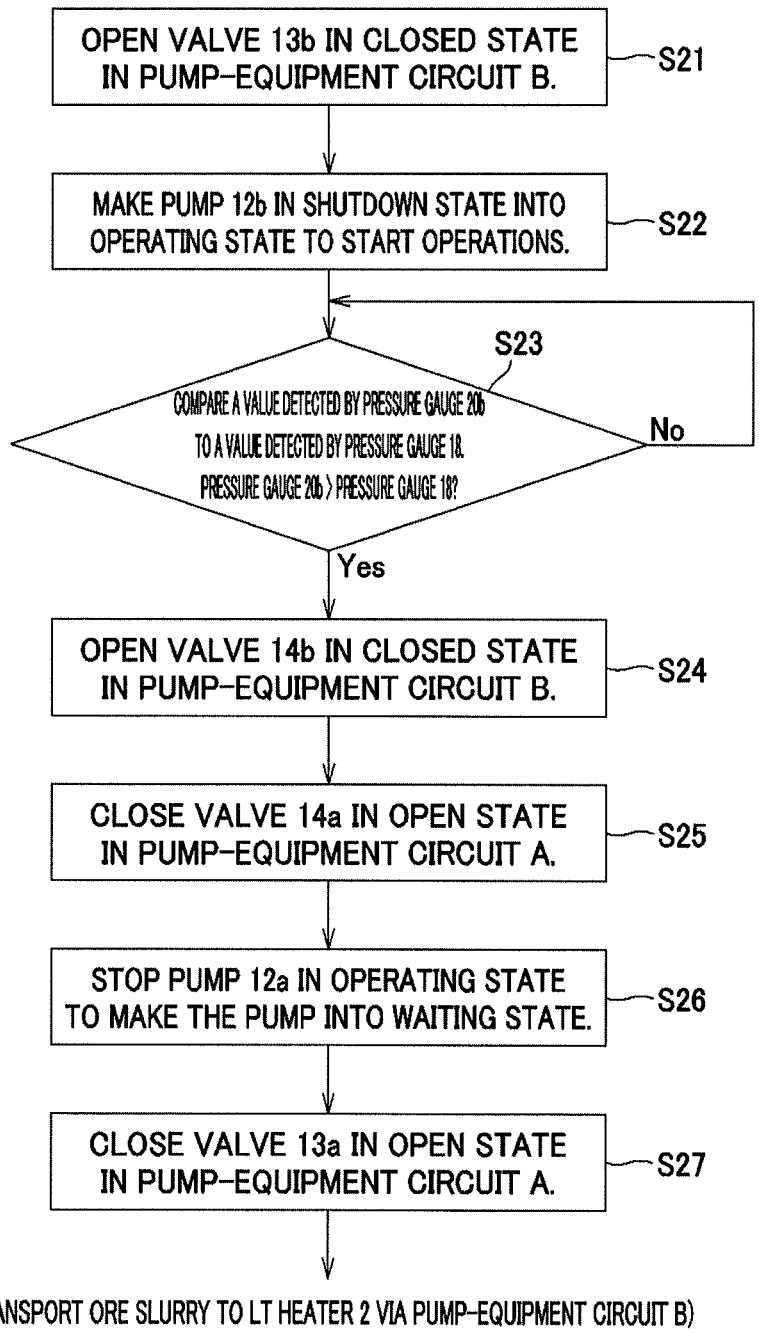
FIG. 4 is a flowchart illustrating a flow of an operation (slurry transportation control) at the time of switchover between pump-equipment circuits in a slurry-transporting facility.

Next, there will be described a switchover process between two pump-equipment circuits (pump-equipment circuit A, pump-equipment circuit B) provided in the slurry-transporting facility 10, in other words, an ore slurry transportation control method at the time of switchover between the pump-equipment circuits. Specifically, an operation flow (control flow) at the time of switchover between the pump-equipment circuits in the slurry-transporting facility 10 is illustrated in FIG. 4. It should be noted that, in the flow in FIG. 4, there is shown an example of switchover from the use of the pump-equipment circuit A in an operating state to the use of the pump-equipment circuit B in a waiting state (pump-equipment circuit A pump→equipment circuit B), but, also in the case of switchover from the use of the pump-equipment circuit B in an operating state to the use of the pump-equipment circuit A in a waiting state (pump-equipment circuit B→pump-equipment circuit A), ore slurry can be appropriately transported by the same operations as the corresponding ones in the switchover from the pump-equipment circuit A to the pump-equipment circuit B.

First, as Step S21, the first valve 13b in a closed state in the pump-equipment circuit B in a waiting state is opened. This operation allows ore slurry supplied from the feed tank 1 to flow also into the pipe arrangement 11b in the pump-equipment circuit B.

Subsequently, as Step S22, the transport pump 12b in a shutdown state in the pump-equipment circuit B is made into an operating state to start operating. Then, high-pressure pump-transportation by the transport pump 12b is started, whereby ore slurry flowing into the pipe arrangement 11b is transported downstream.

Next, in Step S23, a pressure value detected by the pressure gauge 20b configured to detect a pressure in the pipe arrangement 11b to which ore slurry is transported at high pressure by the transport pump 12b is compared to a pressure value detected by the pressure gauge 18 configured to detect a pressure in the uniting pipe arrangement 16, and it is determined whether or not the pressure value detected by the pressure gauge 20b is larger than the pressure value detected by the pressure gauge 18 (Pressure 20b>Pressure 18?). In Step S23, when the pressure value detected by the pressure gauge 20b is determined to be larger (when it is determined Yes), then the operation proceeds to Step S24. On the contrary, when the pressure value detected by the pressure gauge 20b is determined to be equal to or smaller than the pressure value detected by the pressure gauge 18 (when it is determined No), the determination process in Step S23 is repeated again.

In Step S24, since the pressure value detected by the pressure gauge 20b has been determined to be larger than the pressure value detected by the pressure gauge 18 in Step 23, the second valve 14b provided downstream from the pressure gauge 20b in the pipe arrangement 11b is opened. Thus, ore slurry passing through the pipe arrangement 11b is made to flow into the uniting pipe arrangement 16 by high-pressure transportation using the transport pump 12b.

Next, in Step S25, the second valve 14a in an open state which is provided in the pipe arrangement 11a in the pump-equipment circuit A is closed. That is, since the transportation of ore slurry via the pump-equipment circuit B has started without problems, the transportation of ore slurry via the pump-equipment circuit A is stopped.

Next, in Step S26, the transport pump 12a still in an operating state in the pump-equipment circuit A is made to stop operating and become in a waiting state.

Then, in Step S27, the first valve 13a in an open state which is provided in the pipe arrangement 11a in the pump-equipment circuit A is closed, thereby leading to a state in which the transport operation is carried out only by the pump-equipment circuit B.

As mentioned above, at the time of switchover between the pump-equipment circuits (pump-equipment circuit A pump→equipment circuit B) in the slurry-transporting facility 10, while the pump-equipment circuit A in operation is maintained to be in the operating state, the transport pump 12b on standby in the pump-equipment circuit B is operated, and, with making a comparison between a pressure value detected by the pressure gauge 20b installed in the pipe arrangement 11b in the pump-equipment circuit B and a pressure value detected by the pressure gauge 18 in the uniting pipe arrangement 16, the slurry starts to be transported to the LT heater 2 via the pump-equipment circuit B. Then, after it is confirmed that the transportation of ore slurry via the pump-equipment circuit B has been started without problems, in the pump-equipment circuit A in operation, the ON/OFF valves (13a and 14a) in the pipe arrangement 11a are closed and the transport pump 12a is stopped.

Such operation allows ore slurry to be continuously transported to the LT heater 2 even at the time of switchover between the pump-equipment circuits, and does not cause a temporal (a-few-hour) stop of the transportation of slurry to the transport destination, whereby a decrease in transportation efficiency can be prevented. Furthermore, thus the transportation of ore slurry is not stopped, and therefore, without causing an adverse impact on processing and equipment in downstream processes, a decrease in operation efficiency can be also prevented. Also at the time of this switchover, while it is appropriately confirmed that a pressure on the downstream side to which ore slurry is to be transported is lower, the transportation is performed, and therefore, without backflow of the ore slurry, the slurry can be stably transported to the LT heater 2.

<3-1-3. Switchover Process Between Pump-Equipment Circuits (2) Modified Example>

Figure 5:
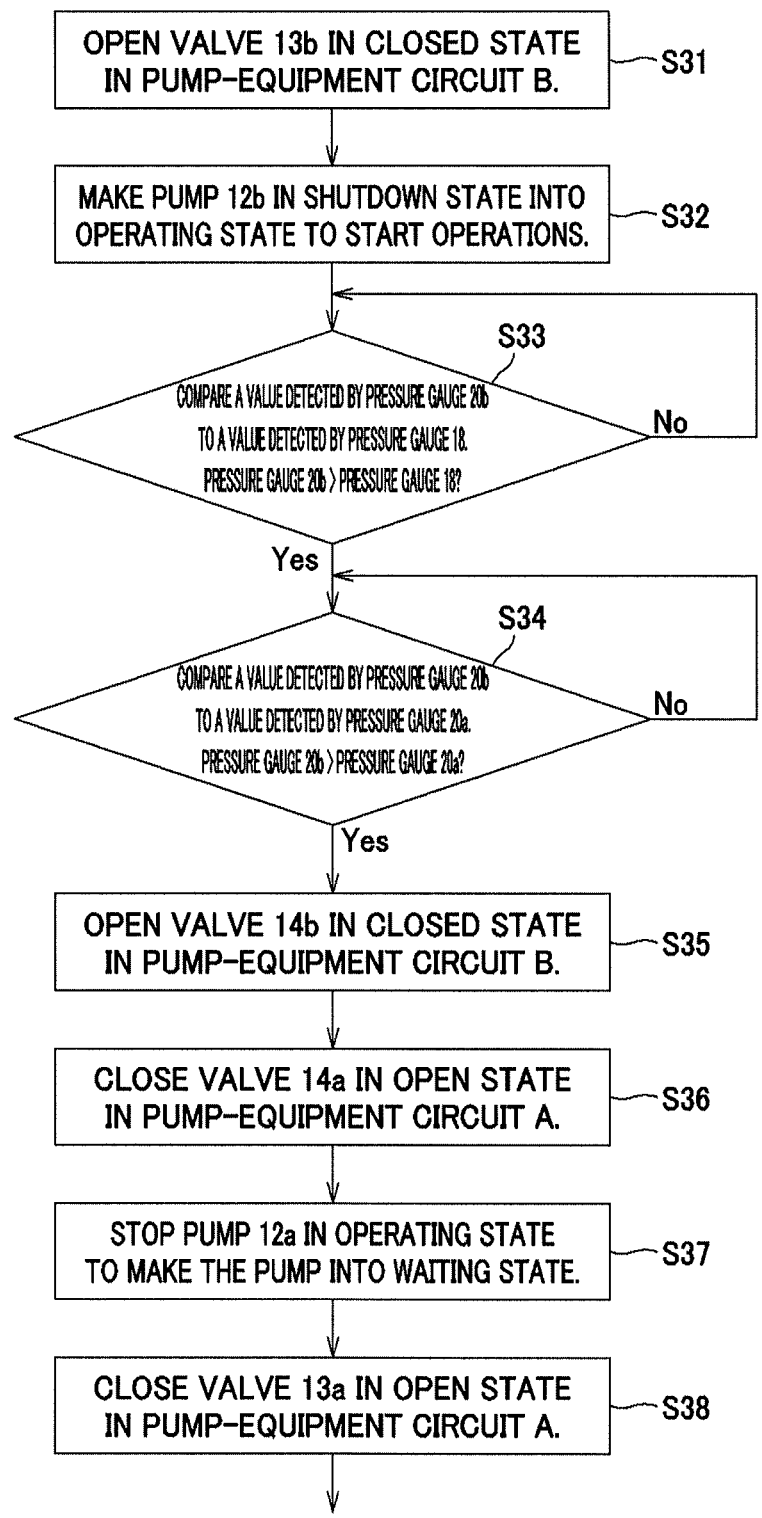
FIG. 5 is a flowchart illustrating a flow of an operation (slurry transportation control) in a modified example at the time of switchover between pump-equipment circuits in a slurry-transporting facility.

As a modified example of a switchover process between a plurality of the pump-equipment circuits, the transportation of ore slurry may be controlled in accordance with an operation flow illustrated in FIG. 5. It should be noted that, also in the flow of in FIG. 5, there is shown an example of switchover from the use of the pump-equipment circuit A in an operating state to the use of the pump-equipment circuit B in a waiting state (pump-equipment circuit A→pump-equipment circuit B).

First, as Step S31, the first valve 13b in a closed state in the pump-equipment circuit B in a waiting state is opened.

Subsequently, as Step S32, the transport pump 12b in a shutdown state in the pump-equipment circuit B is made into an operating state to start operating.

Next, in Step S33, a pressure value detected by the pressure gauge 20b configured to detect a pressure in the pipe arrangement 11b to which ore slurry is transported at high pressure by the transport pump 12b having just started operating is compared to a pressure value detected by the pressure gauge 18 configured to detect a pressure in the uniting pipe arrangement 16, and it is determined whether or not the pressure value detected by the pressure gauge 20b is larger than the pressure value detected by the pressure gauge 18 (Pressure 20b>Pressure 18?). In this Step S33, when the pressure value detected by the pressure gauge 20b is determined to be larger (when it is determined Yes), then the operation proceeds to Step S34. On the contrary, when the pressure value detected by the pressure gauge 20b is determined to be equal to or smaller than the pressure value detected by the pressure gauge 18 (when it is determined No), the determination process in Step S33 is repeated again.

Then, in this Modified Example, in the subsequent Step S34, the pressure value detected by the pressure gauge 20b configured to detect a pressure in the pipe arrangement 11b is furthermore compared to a pressure value detected by the pressure gauge 20a configured to detect a pressure in the pipe arrangement 11a in the pump-equipment circuit A, and it is determined whether or not the pressure value detected by the pressure gauge 20b is larger than the pressure value detected by the pressure gauge 20a (Pressure 20b>Pressure 20a?). In this Step S34, when the pressure value detected by the pressure gauge 20b is determined to be larger (when it is determined Yes), then the operation proceeds to Step S35. On the contrary, when the pressure value detected by the pressure gauge 20b is determined to be equal to or smaller than the pressure value detected by the pressure gauge 20a (when it is determined No), the determination process in Step S34 is repeated again.

In Step S35, since the pressure value detected by the pressure gauge 20b has been determined to be larger than the pressure value detected by the pressure gauge 18 in Step 33 and furthermore the pressure value detected by the pressure gauge 20b has been determined to be larger than the pressure value detected by the pressure gauge 20a in Step 34, the second valve 14b provided downstream from the pressure gauge 20b in the pipe arrangement 11b of the pump-equipment circuit B is opened. Thus, ore slurry passing through the pipe arrangement 11b is made to flow into the uniting pipe arrangement 16 by high-pressure transportation using the transport pump 12b.

Next, in Step S36, the second valve 14a in an open state which is provided in the pipe arrangement 11a in the pump-equipment circuit A is closed. That is, since the transportation of ore slurry via the pump-equipment circuit B is started without problems, the transportation of ore slurry via the pump-equipment circuit A is stopped.

Next, in Step S37, the transport pump 12a still in an operating state in the pump-equipment circuit A is stopped to be made into a waiting state.

Then, in Step S38, the first valve 13a in an open state which is provided in the pipe arrangement 11a in the pump-equipment circuit A is closed, whereby a state in which transport operation is performed only by the pump-equipment circuit B is attained.

As mentioned above, in Modified Example, at the time of switchover between the pump-equipment circuits (pump-equipment circuit A→pump-equipment circuit B) in the slurry-transporting facility 10, there is made a comparison between a pressure value detected by the pressure gauge 20b provided in the pipe arrangement 11b in the pump-equipment circuit B and a pressure value detected by the pressure gauge 18 in the uniting pipe arrangement 16, and furthermore, a comparison between the pressure value detected by the pressure gauge 20b in the pump-equipment circuit B and a pressure value detected by the pressure gauge 20a provided in the pipe arrangement 11a in the pump-equipment circuit A is made.

Thus, not only a comparison between a pressure value detected in the uniting pipe arrangement 16 provided downstream from the pump-equipment circuit B and a pressure value detected in the pump-equipment circuit B, but also a comparison between pressure values detected in the pump-equipment circuits which are subject to switchover are made, and, based on the comparison results, the ON/OFF valves (13a and 14a) in the pump-equipment circuit A which is to be made into a waiting state is closed, whereby backflow of ore slurry can be more effectively prevented. Furthermore, this makes it possible to prevent expensive pump-equipment circuits from being damaged and an excessive maintenance inspection from being required, whereby more efficient operation can be achieved.

3-2. Second Embodiment (in the Case of Pump-Equipment Circuits Each Having not Less than Two Contiguous High-Pressure Pumps)

Next, as a second embodiment, an ore slurry transportation control method using the slurry-transporting facility 10' whose configuration example is illustrated in FIG. 2 will be described. As mentioned above, the slurry-transporting facility 10' is equipped with two pump-equipment circuits (pump-equipment circuit C, pump-equipment circuit D), and each of the pump-equipment circuits is equipped with two contiguous transport pumps. Also this slurry-transporting facility 10' uses the two pump-equipment circuits by suitable switchover between the circuits and transports ore slurry supplied from the LT heater 2 to the MT heater 3 (liquid-transportation at high pressure).

<3-2-1. Startup Operation at the Time of Starting (or after Shutdown)>

Figure 6:
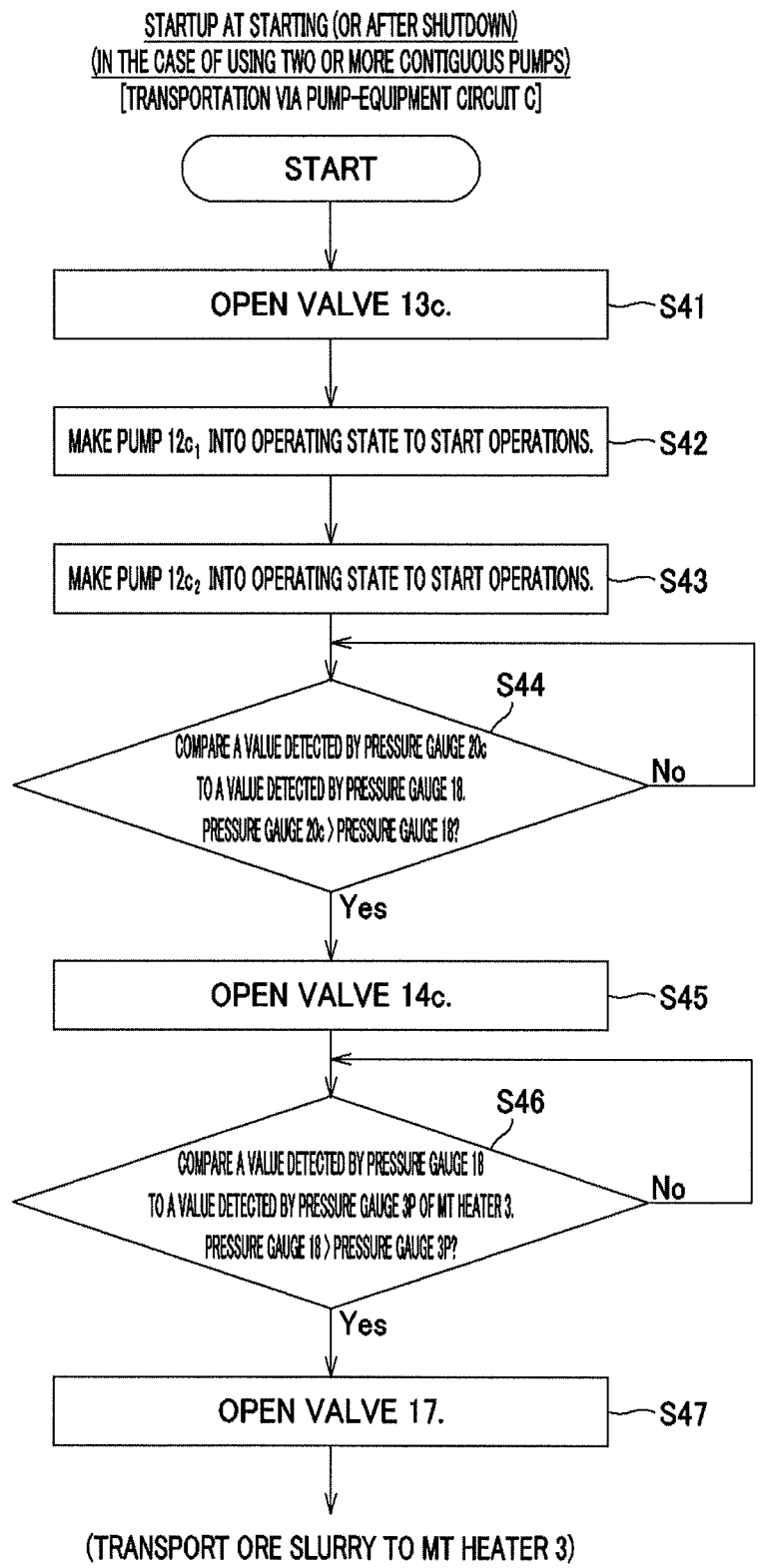
FIG. 6 is a flowchart illustrating a flow of an operation at the time of start (a first startup) of the transportation of slurry in a slurry-transporting facility (equipped with pump-equipment circuits each having two contiguous high-pressure pumps).

First, an operation at the time of start of ore slurry transportation by the slurry-transporting facility 10', in other words, a startup operation at a first starting or after shutdown will be described. Specifically, FIG. 6 illustrates an operation flow (control flow) at the time of starting the transportation of ore slurry by the slurry-transporting facility 10'. It should be noted that the flow illustrated in FIG. 6 shows an example of transporting ore slurry from the LT heater 2 to the MT heater 3 by operating the pump-equipment circuit C out of the two pump-equipment circuits at the time of the first starting.

It should be noted that, in each of the following steps, also in this startup operation, in the case where, after a lapse of a certain time, normal operation still cannot be attained, a return to an initial state is made from a viewpoint of facility protection as is the case with the startup operation by the slurry-transporting facility 10.

First, as Step S41, the first valve 13c provided in the pipe arrangement 11c in the pump-equipment circuit C is opened. This allows ore slurry supplied from the LT heater 2 to flow into the pipe arrangement 11c in the pump-equipment circuit C.

Next, as Step S42, the transport pump $12c_1$ downstream from the first valve 13c in the pumping 11c is made into an operating state to start operating. Then, high-pressure pump-transportation by the transport pump $12c_1$ is started, whereby ore slurry flowing into the pipe arrangement 11c is transported downstream.

Subsequently, as Step S43, the transport pump $12c_2$ provided so as to be contiguous to the transport pump $12c_1$ in the pipe arrangement 11c is made into an operating state to start operating. Then, the combination of high-pressure pump-transportation by the transport pump $12c_1$ and high-pressure pump-transportation by the transport pump $12c_2$ allows ore slurry flowing into the pipe arrangement 11b to be transported downstream under a higher pressure.

Next, in Step S44, a pressure value detected by the pressure gauge 20c configured to detect a pressure in the pipe arrangement 11c to which ore slurry is transported at high pressure by the transport pump $12c_1$ and the transport pump $12c_2$ is compared to a pressure value detected by the pressure gauge 18 configured to detect a pressure in the uniting pipe arrangement 16, and it is determined whether or not the pressure value detected by the pressure gauge 20c is larger than the pressure value detected by the pressure gauge 18 (Pressure 20c>Pressure 18?). In this Step S44, when the pressure value detected by the pressure gauge 20c is determined to be larger (when it is determined Yes), then the operation proceeds to Step S45. On the contrary, when the pressure value detected by the pressure gauge 20c is determined to be equal to or smaller than the pressure value detected by the pressure gauge 18 (when it is determined No), the determination process in Step S44 is repeated.

In Step S45, since the pressure value detected by the pressure gauge 20c has been determined to be larger than the pressure value detected by the pressure gauge 18 in Step 44, the second valve 14c provided downstream from the pressure gauge 20c in the pipe arrangement 11c is opened. Thus, ore slurry passing through the pipe arrangement 11c is made to flow into the uniting pipe arrangement 16 by high-pressure transportation using the transport pump $12c_1$ and the transport pump $12c_2$.

Next, in Step S46, a pressure value detected by the pressure gauge 18 configured to detect a pressure in the uniting pipe arrangement 16 is compared to a pressure value detected by the pressure gauge 3P provided in the MT heater 3 serving as a transport destination for ore slurry (the pressure value in the MT heater 3), and it is determined whether or not the pressure value detected by the pressure gauge 18 is larger than the pressure value detected by the pressure gauge 3P (Pressure 18>Pressure 3P?). In this Step S46, when the pressure value detected by the pressure gauge 18 is determined to be larger (when it is determined Yes), then the operation proceeds to Step S47. On the contrary, when the pressure value detected by the pressure gauge 18 is determined to be equal to or smaller than the pressure value detected by the pressure gauge 3P (when it is determined No), the determination process in Step S46 is repeated again.

In Step S47, since the pressure value detected by the pressure gauge 18 has been determined to be larger than the pressure value detected by the pressure gauge 3P in Step 46, the third valve 17 provided downstream from the pressure gauge 18 in the uniting pipe arrangement 16 is opened. Thus, ore slurry passing through the uniting pipe arrangement 16 is transported to the MT heater 3 by high-pressure transportation by the pump-equipment circuit C.

As mentioned above, also in the slurry-transporting facility 10', at the time of start of the transportation (at the time of startup), with making a comparison between a pressure value detected by the pressure gauge 20c and a pressure value detected by the pressure gauge 18 and a comparison between a pressure value detected by the pressure gauge 18 and a pressure value detected by the pressure gauge 3P in the MT heater 3, opening-and-closing control for the ON/OFF valves provided downstream from the respective pressure gauges is performed to control the transportation of ore slurry. Thus, while it is appropriately confirmed that a pressure on the downstream side to which ore slurry is to be transported is lower, the transportation can be performed, and, without backflow of ore slurry, the slurry can be stably transported to the MT heater 3.

<3-2-2. Switchover Process Between Pump-Equipment Circuits>

Figure 7:
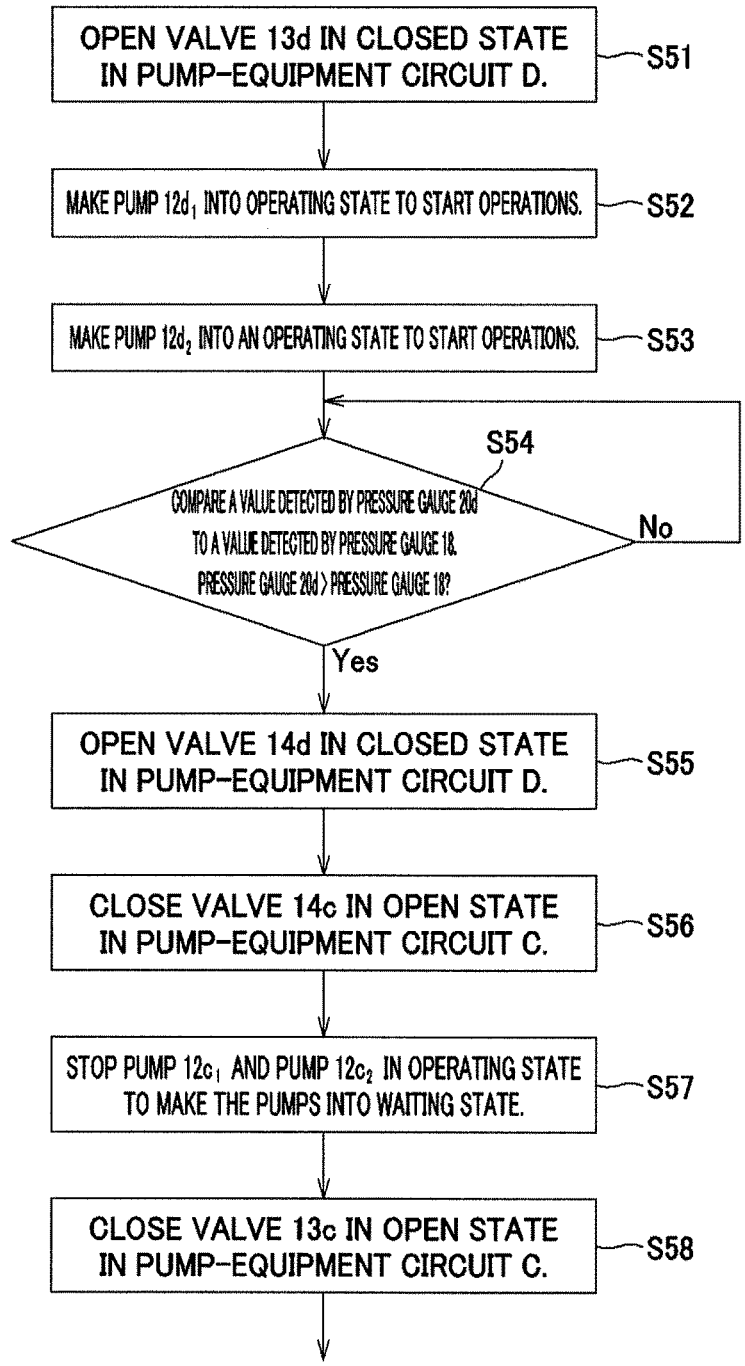
FIG. 7 is a flowchart illustrating a flow of an operation (slurry transportation control) at the time of switchover between pump-equipment circuits in a slurry-transporting facility (equipped with pump-equipment circuits each having two contiguous high-pressure pumps).

Next, there will be described a switchover process between two pump-equipment circuits (pump-equipment circuit C, pump-equipment circuit D) provided in the slurry-transporting facility 10', in other words, an ore slurry transportation control method at the time of switchover between the pump-equipment circuits. Specifically, FIG. 7 illustrates an operation flow (control flow) at the time of switchover between the pump-equipment circuits in the slurry-transporting facility 10'. It should be noted that, in the flow in FIG. 7, there is shown an example of switchover from the use of the pump-equipment circuit C in an operating state to the use of the pump-equipment circuit D in a waiting state (pump-equipment circuit C→pump-equipment circuit D), but, also in the case of switchover from the use of the pump-equipment circuit D in an operating state to the use of the pump-equipment circuit C in a waiting state (pump-equipment circuit D→pump-equipment circuit C), ore slurry can be appropriately transported by the same operations as the corresponding ones in the switchover from the pump-equipment circuit C to the pump-equipment circuit D.

First, as Step S51, the first valve 13d in a closed state in the pump-equipment circuit D in a waiting state is opened. This allows ore slurry supplied from the feed tank 1 to flow into the pipe arrangement 11d in the pump-equipment circuit D.

Next, as Step 52, the transport pump $12d_1$ in a shutdown state in the pump-equipment circuit D is made into an operating state to start operating. Then, high-pressure pump-transportation by this transport pump $12d_1$ is started, whereby ore slurry flowing into the pipe arrangement 11d is transported downstream.

Subsequently, as Step S53, the transport pump $12d_2$ which is provided so as to be contiguous to the transport pump $12d_1$ in the pipe arrangement 11d in the pump-equipment circuit D is made into an operating state to start operating. Then, the combination of high-pressure pump-transportation by the transport pump $12d_1$ and high-pressure pump-transportation by the transport pump $12d_2$ allows ore slurry flowing into the pipe arrangement 11d to be transported downstream under a higher pressure.

Next, in Step S54, a pressure value detected by the pressure gauge 20d configured to detect a pressure in the pipe arrangement 11d to which ore slurry is transported at high pressure by the transport pump $12d_1$ and the transport pump $12d_2$ is compared to a pressure value detected by the pressure gauge 18 configured to detect a pressure in the uniting pipe arrangement 16, and it is determined whether or not the pressure value detected by the pressure gauge 20d is larger than the pressure value detected by the pressure gauge 18 (Pressure 20d>Pressure 18?). In this Step S54, when the pressure value detected by the pressure gauge 20d is determined to be larger (when it is determined Yes), then the operation proceeds to Step S55. On the contrary, when the pressure value detected by the pressure gauge 20d is determined to be equal to or smaller than the pressure value detected by the pressure gauge 18 (when it is determined No), the determination process in Step S54 is repeated again.

In Step S55, since the pressure value detected by the pressure gauge 20d has been determined to be larger than the pressure value detected by the pressure gauge 18 in Step S54, the second valve 14d provided downstream from the pressure gauge 20d in the pipe arrangement 11d is opened. Thus, ore slurry passing through the pipe arrangement 11d is made to flow into the uniting pipe arrangement 16 by high-pressure transportation by the transport pump $12d_1$ and the transport pump $12d_2$.

Next, in Step S56, the second valve 14c in an open state which is provided in the pipe arrangement 11c in the pump-equipment circuit C is closed. That is, since the transportation of ore slurry via the pump-equipment circuit D is started without problems, the transportation of ore slurry via the pump-equipment circuit C is stopped.

Next, in Step S57, the transport pump $12c_1$ and the transport pump $12c_2$ which are still in an operating state in the pump-equipment circuit C are stopped to be made into a waiting state.

Then, in Step S58, the first valve 13c in an open state which is provided in the pipe arrangement 11c in the pump-equipment circuit C is closed, whereby a state in which transport operation is performed only by the pump-equipment circuit D is attained.

As mentioned above, also in the slurry-transporting facility 10', at the time of the switchover between the pump-equipment circuits (pump-equipment circuit C→pump-equipment circuit D), while the pump-equipment circuit C in operation is maintained to be in the operating state, the transport pump $12d_1$ and the transport pump $12d_2$ in the pump-equipment circuit D which are in a waiting state are operated in turn, and, with making a comparison between a pressure value detected by the pressure gauge 20d provided in the pipe arrangement 11d in the pump-equipment circuit D and a pressure value detected by the pressure gauge 18 in the uniting pipe arrangement 16, the transportation to the MT heater 3 via the pump-equipment circuit D is started. Then, after it is confirmed that the transportation of ore slurry via the pump-equipment circuit D is started without problems, in the pump-equipment circuit C in operation, the ON/OFF valves (13c, 14c) in the pipe arrangement 11c are closed, and the transport pump $12c_1$ and the transport pump $12c_2$ are stopped.

Such operation allows ore slurry to be continuously transported to the MT heater 3 even at the time of switchover between the pump-equipment circuits each having two contiguous high-pressure pumps, and does not cause a temporal (a-few-hour) stop of the transportation of slurry to the transport destination, whereby a decrease in transportation efficiency can be prevented. Furthermore, as mentioned above, a stop of the transportation of ore slurry is not caused, and therefore, without causing an adverse impact on processing and equipment in downstream processes, a decrease in operation efficiency can be also prevented. Also at the time of this switchover, while it is appropriately confirmed that a pressure on the downstream side to which ore slurry is to be transported is lower, the transportation is performed, and therefore, without backflow of ore slurry, the slurry can be stably transported to the MT heater 3.

It should be noted that, also to the slurry-transporting facility 10' according to the present embodiment, the switchover process between the pump-equipment circuits mentioned as Modified Example in the first embodiment (Switchover process between pump-equipment circuits (2)) may be applied. This application allows backflow of ore slurry to be more effectively prevented and ore slurry to be more stably transported to the MT heater 3.

4. Example

Next, Examples adopting the present invention will be described, but, the present invention is not limited to the following Examples.

Examples

Ore Slurry Transport Operation

Example 1

As Example 1, an operation was performed such that, in a leaching step of a nickel refining process using high pressure acid leach (HPAL), a nickel oxide ore was wet-grinded and sieved to obtain an ore slurry having a grain size adjusted as predetermined, and, while heating processing in three stages (low temperature, middle temperature, high temperature) was applied to the obtained ore slurry, the ore slurry was transported to an autoclave configured to perform leaching processing. At this time, between a slurry feed tank configured to supply ore slurry and the autoclave, there were provided slurry-transporting facilities having configurations based on the slurry-transporting facilities 10 and 10' illustrated in FIG. 1 and FIG. 2, respectively, and via those slurry-transporting facilities, ore slurry was transported to the autoclave.

Specifically, first, as a first stage, the slurry-transporting facility 10 illustrated in FIG. 1 constituted a space between an ore slurry feed tank and an LT (Low temperature) heater. Then, as a second stage, the slurry-transporting facility 10' illustrated in FIG. 2 constituted a space between the LT heater to an MT (Middle temperature) heater. Then, as a third stage, a space between the MT heater and a HT (High temperature) heater was constituted of a slurry-transporting facility obtained by making the slurry-transporting facility 10' illustrated in FIG. 2 have pump-equipment circuits each equipped with three contiguous high-pressure pumps.

Specifically, in each of the slurry-transporting facilities, a first valve and a second valve were provided in a pipe arrangement in each of the circuits to perform ON/OFF control for the transportation of ore slurry, and a transport pump (high-pressure pump) was provided between the first valve and the second valve so as to make a high-pressure transportation possible. Furthermore, particularly in each of these slurry-transporting facilities, a pressure gauge configured to measure a pressure in the pipe arrangement was provided at a position downstream from the transport pump and upstream from the second valve.

In the slurry-transporting facility having the foregoing configuration, pump-transportation was carried out using only one of the two pump-equipment circuits, in other words, only one of the pump-equipment circuits was made into an operating state while the other pump-equipment circuit was made into a waiting state, and the pump-equipment circuits were switched over to each other and used by turns to make continuous transportation operation possible. It should be noted that the switchover between the pump-equipment circuits was performed at the time of a periodic maintenance inspection for one of the circuits.

Furthermore, slurry transportation control at the time of switchover between the two pump-equipment circuits was conducted based on the flow illustrated in FIG. 4. That is, for example, at the time of switchover from the use of a first pump-equipment circuit to the use of a second pump-equipment circuit, first, the first valve provided in the pipe arrangement in the second circuit was opened. Next, the transport pump in the second circuit was changed to an operating state to be operated. Next, a pressure value detected by the pressure gauge provided downstream from the transport pump in the pipe arrangement in the second circuit was compared to a pressure value detected by the pressure gauge provided in uniting pipe arrangement, and at the time when the pressure value detected by the pressure gauge provided in the pipe arrangement in the second circuit became larger, the second valve provided in the pipe arrangement in the second circuit was opened. Then, the second valve provided in the pipe arrangement in the first circuit was closed. Next, the transport pump provided in the pipe arrangement in the first circuit was stopped to be made into a waiting state and the first valve was closed.

A six-month operation was carried out with repeating such transportation operation for ore slurry. It should be noted that, during the six-month operation, 30 switchover-operations between the two pump-equipment circuits were performed.

Comparative Example 1

Figure 8:
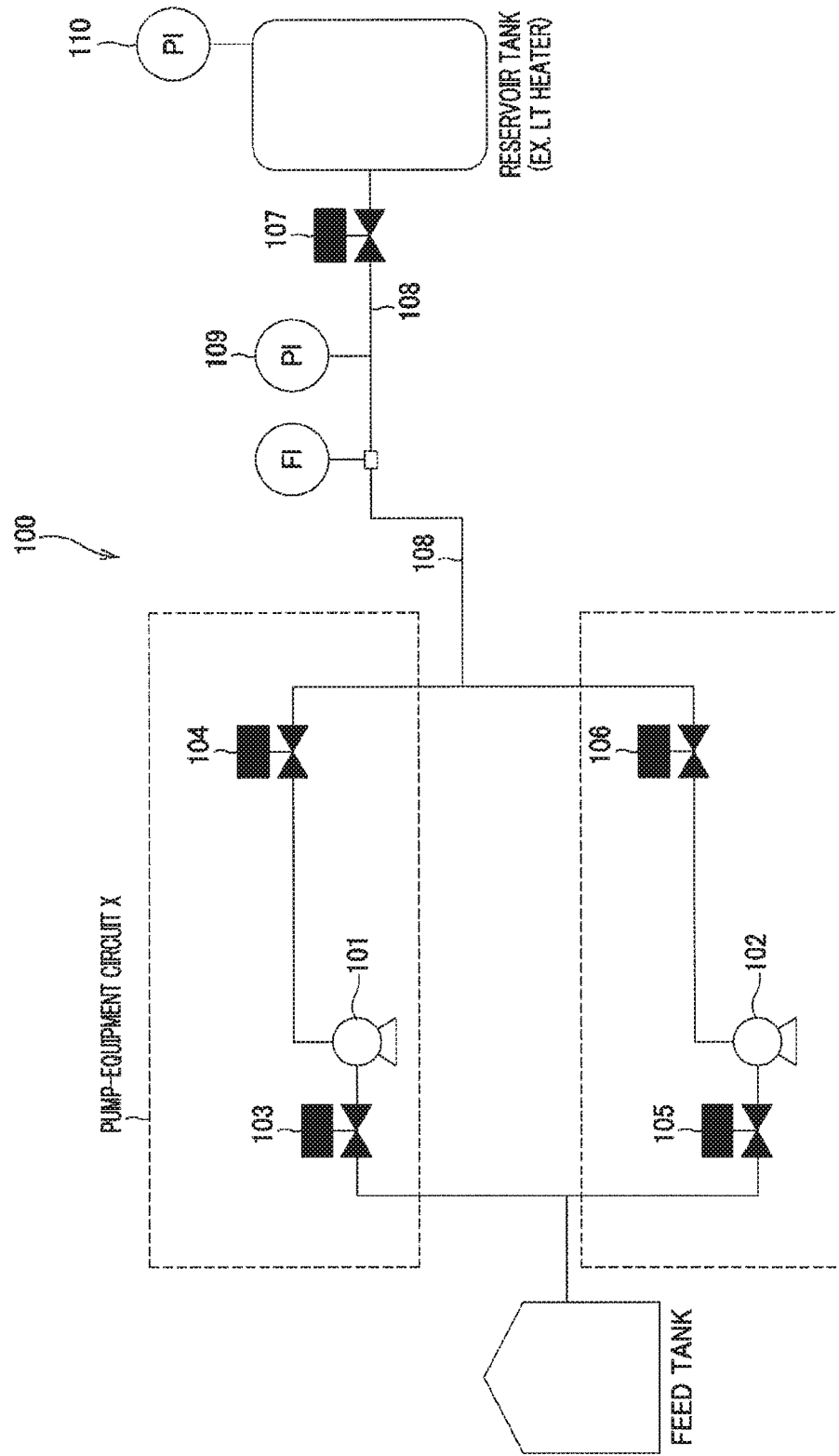
FIG. 8 is a schematic diagram of a conventional slurry-transporting facility.

In Comparative Example 1, when ore slurry was transported to an autoclave in the same manner as in Example 1, operation was performed using a conventional slurry-transporting facility. Specifically, the operation was carried out using the slurry-transporting facility 100 illustrated in FIG. 8. Furthermore, also in the slurry-transporting facility 100, as is the case with Example 1, pump-transportation was carried out using only one of the two pump-equipment circuits, in other words, only one of the pump-equipment circuits was made into an operating state while the other pump-equipment circuit was made into a waiting state, and the pump-equipment circuits were switched over to each other and used by turns to make continuous transportation operation possible.

Then, a six-month operation was carried out with repeating such transportation operation for ore slurry by using the slurry-transporting facility 100. It should be noted that, during the six-month operation, 31 switchover-operations between the two pump-equipment circuits were performed.

<Evaluation of Operation>

To evaluate each of the foregoing operations, the occurrence of troubles caused by switchover between the pump-equipment circuits was checked. As the troubles caused by switchover between the pump-equipment circuits, there can be mentioned a stop of the addition of sulfuric acid in an autoclave to which ore slurry was transported via a slurry-transporting facility, and a shutdown of a nickel refining plant itself due to a delay in the supply of ore slurry. Hence, to evaluate operations in Examples, the frequency of stop of the addition of sulfuric acid in an autoclave and the frequency of shutdown of the plant itself were checked.

<Results>

The following Table 1 collectively shows evaluation results of the operations in Example 1 and Comparative Example 1.

TABLE 1

| | Frequency of switchover between pump-equipment circuits (the number of times) | Frequency of stop of sulfuric acid addition (the number of times) | Frequency of plant shutdown (the number of times) |
|---|---|---|---|
| Example 1 | 30 | 12 | 0 |
| Comparative Example 1 | 31 | 31 | 1 |

As shown in Table 1, in the operations in Comparative Example 1 using the conventional slurry-transporting facility, the addition of sulfuric acid in an autoclave was stopped at 31 different times during the operation period (six months), and thus, the addition of sulfuric acid had to be stopped every switchover between the pump-equipment circuits, and operation efficiency was considerably lower. Furthermore, a situation in which the plant itself had to be shut down was caused once, and accordingly, an equipment inspection in each reaction process, readjustment of reaction conditions, and a re-startup operation were needed.

In other words, in the case of the operations in Comparative Example 1, a pump-equipment circuit in an operating state was always stopped first, and then, the other pump-equipment circuit was operated. Therefore, the amount of slurry held in the heater serving as a transport destination decreased, and furthermore, there was not enough time to start up the other circuit. Hence, it is considered that the supply of slurry to the autoclave was stopped, and as a result, the addition of sulfuric acid to the autoclave had to be stopped.

On the other hand, in the operations in Example 1 using a slurry-transporting facility illustrated in FIG. 1 and FIG. 2, during the operation period (six months), the addition of sulfuric acid in the autoclave was stopped only at 12 different times, and a situation in which the plant itself had to be shut down was never caused (0 counts), and thus an efficient operation was performed.

REFERENCE SYMBOLS

1 . . . feed tank, 2 . . . LT heater, 3 . . . MT heater, 2P, 3P . . . pressure gauge, 10, 10' . . . slurry-transporting facility, 11, 11a, 11b, 11c, 11d . . . pipe arrangement, 12, 12a, 12b, 12$c_1$, 12$c_2$, 12$d_1$, 12$d_2$ . . . transport pump, 13, 13a, 13b, 13c, 13d . . . valve, 14, 14a, 14b, 14c, 14d . . . valve, 15 . . . coupling point, 16 . . . uniting pipe arrangement, 17 . . . valve, 18 . . . pressure gauge, 19 . . . flowmeter, and 20, 20a, 20b, 20c, 20d . . . pressure gauge.

The invention claimed is:

1. A slurry transportation control method which uses a slurry-transporting facility configured to transport slurry from a feed tank to a reservoir tank provided with a pressure gauge via one of two pump-equipment circuits, the slurry-transporting facility comprising:

pipe arrangements which branch out from the feed tank into the each of the two pump-equipment circuits;

the two pump-equipment circuits being a first pump-equipment circuit and a second pump-equipment circuit, each comprising:

a transport pump provided in one of the pipe arrangements;

a first valve provided upstream from the transport pump in the one pipe arrangement;

a second valve provided downstream from the transport pump in the one pipe arrangement; and a first pressure gauge provided downstream from the transport pump and upstream from the second valve, the first pressure gauge being configured to measure a pressure in the one pipe arrangement;

a uniting pipe arrangement formed by joining of the pipe arrangements of the first and second pump-equipment circuits at a predetermined position downstream from each second valve and connected to the reservoir tank;

a third valve provided in the uniting pipe arrangement and configured to control slurry transportation to the reservoir tank; and a second pressure gauge provided upstream from the third valve in the uniting pipe arrangement and configured to measure a pressure in the uniting pipe arrangement, the two pump-equipment circuits being used for switchover between the pump-equipment circuits, and, at a time of switchover from the first pump-equipment circuit, which has its transport pump in an operating state, to the second pump-equipment circuit, to transport slurry via the second pump-equipment circuit, the following steps are executed in order:

opening the first valve of the second pump-equipment circuit;

switching the transport pump of the second pump-equipment circuit to an operating state to operate;

opening the second valve of the second pump-equipment circuit after a value detected by the first pressure gauge of the second pump-equipment circuit becomes larger than a value detected by the second pressure gauge provided in the uniting pipe arrangement;

closing the second valve of the first pump-equipment circuit;

stopping the transport pump of the first pump-equipment circuit to place it in a waiting state; and closing the first valve of the first pump-equipment circuit.

2. The slurry transportation control method according to claim 1, wherein the slurry is an ore slurry obtained by wet-grinding and sieving a nickel oxide ore and adjusting a grain size as predetermined.

3. A slurry transportation control method which uses a slurry-transporting facility configured to transport slurry from a feed tank to a reservoir tank provided with a pressure gauge via one of two pump-equipment circuits, the slurry-transporting facility comprising:
- pipe arrangements which branch out from the feed tank into the each of the two pump-equipment circuits;
- the two pump-equipment circuits being a first pump-equipment circuit and a second pump-equipment circuit, each comprising:
  - a transport pump provided in one of the pipe arrangements;
  - a first valve provided upstream from the transport pump in the one pipe arrangement;
  - a second valve provided downstream from the transport pump in the one pipe arrangement; and
  - a first pressure gauge provided downstream from the transport pump and upstream from the second valve, the first pressure gauge being configured to measure a pressure in the one pipe arrangement;
- a uniting pipe arrangement formed by joining of the pipe arrangements of the first and second pump-equipment circuits at a predetermined position downstream from each second valve and connected to the reservoir tank;
- a third valve provided in the uniting pipe arrangement and configured to control slurry transportation to the reservoir tank; and
- a second pressure gauge provided upstream from the third valve in the uniting pipe arrangement and configured to measure a pressure in the uniting pipe arrangement,
- the two pump-equipment circuits being used for switchover between the pump-equipment circuits, and, at a time of switchover from the first pump-equipment circuit, which has its transport pump in an operating state, to the second pump-equipment circuit, to transport slurry via the second pump-equipment circuit, the following steps are executed in order:
- opening the first valve of the second pump-equipment circuit;
- switching the transport pump of the second pump-equipment circuit to an operating state to operate;
- opening the second valve of the second pump-equipment circuit after a value detected by the first pressure gauge of the second pump-equipment circuit becomes larger than a value detected by the second pressure gauge provided in the uniting pipe arrangement and the value detected by the first pressure gauge of the second pump-equipment circuit becomes larger than a value detected by the first pressure gauge of the first pump-equipment circuit;
- closing the second valve of the first pump-equipment circuit;
- stopping the transport pump of the first pump-equipment circuit to place it in a waiting state; and
- closing the first valve of the first pump-equipment circuit.

* * * * *